US010322674B2

(12) United States Patent
Takae et al.

(10) Patent No.: US 10,322,674 B2
(45) Date of Patent: Jun. 18, 2019

(54) DISPLAY CONTROL METHOD AND DISPLAY CONTROL DEVICE

(71) Applicant: Nissan Motor Co., Ltd., Yokohama-shi, Kanagawa (JP)

(72) Inventors: Yasuhiko Takae, Kanagawa (JP); Takashi Sunda, Kanagawa (JP); Tatsuya Shino, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/769,479

(22) PCT Filed: Oct. 22, 2015

(86) PCT No.: PCT/JP2015/079877
§ 371 (c)(1),
(2) Date: Apr. 19, 2018

(87) PCT Pub. No.: WO2017/068692
PCT Pub. Date: Apr. 27, 2017

(65) Prior Publication Data
US 2018/0312110 A1  Nov. 1, 2018

(51) Int. Cl.
*B60R 1/00* (2006.01)
*G06K 9/00* (2006.01)
(Continued)

(52) U.S. Cl.
CPC ............... *B60R 1/00* (2013.01); *B60R 21/00* (2013.01); *G06K 9/00791* (2013.01); *G08G 1/16* (2013.01);
(Continued)

(58) Field of Classification Search
CPC . B60R 1/00; B60R 2300/70; B60R 2300/607; B60R 2300/304; B60K 35/00; B60K 2350/2013; B60K 2350/1088; B60K 2350/35; B60K 2350/906; B60K 2350/106; B60K 2350/1072; B60K 2350/1084; B60K 2350/2039; B60K 2350/352; B60K 2350/924; B60K 2350/965; G06K 9/00791
See application file for complete search history.

(56) References Cited

U.S. PATENT DOCUMENTS 7,145,519 B2  12/2006  Takahashi et al.
8,004,394 B2  8/2011  Englander
(Continued)

FOREIGN PATENT DOCUMENTS

EP  1355285 A1  10/2003
JP  2007028440 A  2/2007
(Continued)

*Primary Examiner* — Obafemi O Sosanya
(74) *Attorney, Agent, or Firm* — Young Basile Hanlon & MacFarlane, P.C.

(57) ABSTRACT

A display control method includes performing display control of detection information of an object detected by a detector including a camera. The detection information includes a first image based on a captured image captured by the camera and a second image based on an image rendered on the basis of a detection result of the detector. The display control method further includes switching and displaying the first image and the second image in accordance with a vehicle speed index of a vehicle.

22 Claims, 21 Drawing Sheets

(51) Int. Cl.
*H04N 5/445* (2011.01)
*B60R 21/00* (2006.01)
*G08G 1/16* (2006.01)
*H04N 7/18* (2006.01)
*H04N 5/247* (2006.01)

(52) U.S. Cl.
CPC ............... *H04N 5/445* (2013.01); *H04N 7/18* (2013.01); *B60R 2300/304* (2013.01); *B60R 2300/306* (2013.01); *H04N 5/247* (2013.01)

(56) References Cited

U.S. PATENT DOCUMENTS

| | | | |
|---|---|---|---|
| 9,294,736 B2 | 3/2016 | Tanuki et al. | |
| 2008/0242502 A1* | 10/2008 | Lin | B60W 10/023 477/80 |
| 2010/0045797 A1* | 2/2010 | Schofield | G06K 9/00818 348/148 |
| 2012/0169875 A1 | 7/2012 | Matsukawa et al. | |
| 2012/0194355 A1* | 8/2012 | Thomas | B60R 1/00 340/932.2 |
| 2013/0286205 A1* | 10/2013 | Okada | H04N 7/18 348/148 |
| 2013/0342524 A1* | 12/2013 | Kotian | G09G 5/14 345/214 |
| 2014/0152774 A1 | 6/2014 | Wakabayashi et al. | |
| 2014/0277940 A1* | 9/2014 | VanVuuren | B60R 1/00 701/36 |

FOREIGN PATENT DOCUMENTS

| | | |
|---|---|---|
| JP | 2007071662 A | 3/2007 |
| JP | 2007282098 A | 10/2007 |
| JP | 2008013022 A | 1/2008 |
| JP | 2008294616 A | 12/2008 |
| JP | 2010218058 A | 9/2010 |
| JP | 2012140106 A | 7/2012 |
| JP | 2014182543 A | 9/2014 |
| JP | 2015144406 A | 8/2015 |

\* cited by examiner

FIG. 2

| Traveling speed (V) | Transmission gear ratio | Road type | Limit speed (Vr) | Distance to object (D) | Traveling scene | Vehicle speed index |
|---|---|---|---|---|---|---|
| Stop to very low speed (0≤V<X1) | First gear | Parking lot | Vr<X1 | D<D1 | Stop/crawl scene | 1 |
| Low speed (X1≤V<X2) | Second gear | General municipal road (excluding urban areas) | X1≤Vr<X2 | D<D2 | Bicycle parallel traveling scene | 2 |
| Middle speed (X2≤V<X3) | Third gear | Urban road | X2≤Vr<X3 | D<D3 | Urban traveling scene | 3 |
| Middle to high speed (X3≤V<X4) | Fourth gear | Arterial road | X3≤Vr<X4 | D<D4 | Suburban traveling scene | 4 |
| High speed (X4≤V) | Fifth gear or more | Motorway, expressway | X4≤Vr<X5 | D4≤D | High-speed cruising scene | 5 |

FIG. 3

| Vehicle speed index | Image type of presentation image |
|---|---|
| 1 | Captured image type |
| 2 | |
| 3 | Overview image type |
| 4 | |
| 5 | |

FIG. 5

| Vehicle speed index | Traveling speed (V) | Captured image used for generation of presentation image |
|---|---|---|
| 1 | $0 \leq V < X1$ | Captured image captured by short-distance camera |
| 2 | $X1 \leq V < X2$ | Captured image captured by middle-distance camera |

FIG. 6A
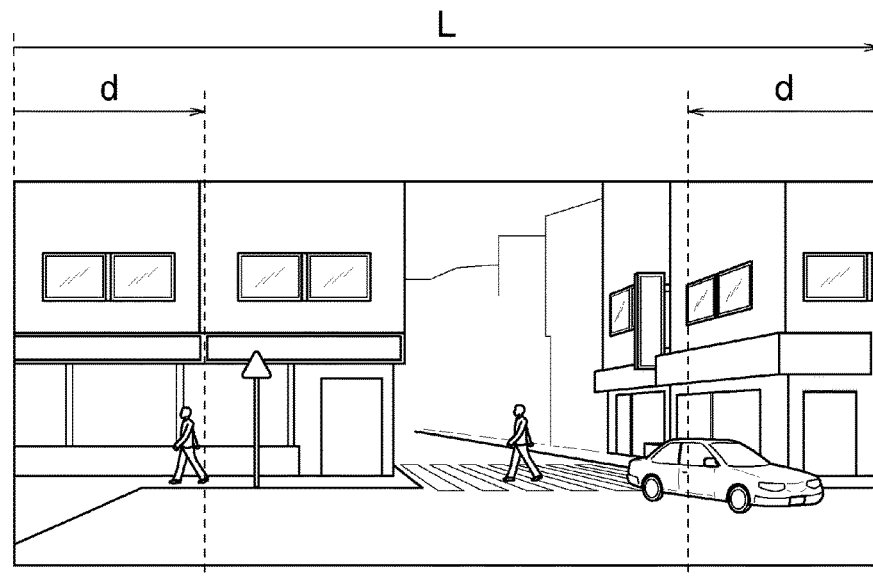
FIG. 6B
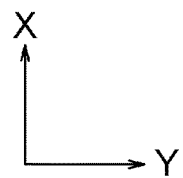

FIG. 7A
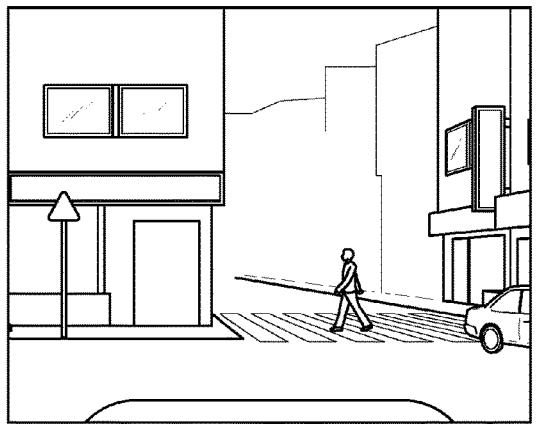
FIG. 7B
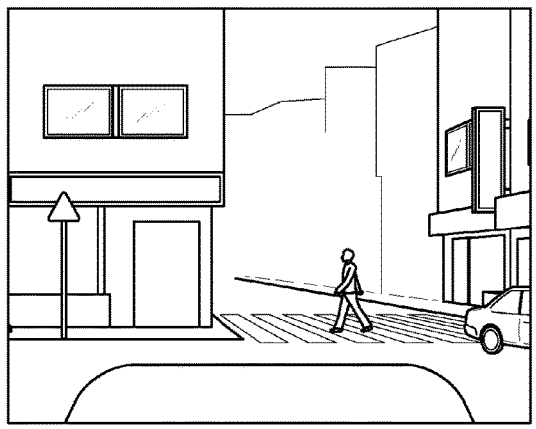
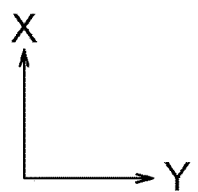

Vehicle speed index

··· 1

··· 2

Switching image

··· 3

··· 4

··· 5

DISPLAY CONTROL METHOD AND DISPLAY CONTROL DEVICE

TECHNICAL FIELD

The present invention relates to a display control method and a display control device for performing display control of detection information of objects.

BACKGROUND

Techniques have heretofore been known in which captured images of outside of a vehicle captured by cameras are displayed on a monitor provided inside the vehicle. Such techniques include a technique of enlarging the size of a captured image in which the image of an object is captured when the traveling speed of the vehicle is high (Japanese Patent Application JP2014-182543A).

In the captured image, however, the landscape and other unnecessary views are captured in addition to the object, and the driver may suffer from information overload depending on the traveling speed of the vehicle. It may thus be difficult for the driver to perceive necessary information on the object.

A problem to be solved by the present invention is to provide a display control method and a display control device capable of appropriately displaying the detection information of an object.

SUMMARY

The present invention solves the above problem by switching and displaying a first image based on a captured image captured by a camera and a second image based on an image rendered on the basis of the detection result of a detector, in accordance with a vehicle speed index of the vehicle.

According to the present invention, the first image based on the captured image captured by the camera and the second image based on the image rendered on the basis of the detection result of the detector are switched in accordance with the vehicle speed index of the vehicle, and the detection information of the object can thereby be displayed in an appropriate display form in accordance with the traveling speed of the subject vehicle.

BRIEF DESCRIPTION OF THE DRAWINGS

FIG. 2 is a chart illustrating an example of the relationship between travel information and a vehicle speed index;

FIG. 3 is a chart illustrating an example of the relationship between the vehicle speed index and the image type of a presentation image;

FIG. 5 is a chart for describing the relationship between the vehicle speed index or the traveling speed of the subject vehicle and a captured image used for generation of the presentation image;

FIGS. 6A and 6B are a set of views for describing the relationship between the traveling speed of the subject vehicle and a mask width of the captured image;

FIGS. 7A and 7B are a set of views each illustrating an example of an image in which a bonnet image is superimposed on the image after a mask process illustrated in FIG. 6B;

DETAILED DESCRIPTION OF THE EMBODIMENTS

Hereinafter, one or more embodiments of the present invention will be described with reference to the drawings. In the embodiments, an information presentation apparatus equipped in a vehicle will be exemplified for description. The information presentation apparatus according to one or more embodiments of the present invention detects pedestrians, bicycles, motorcycles, cars, obstacles on a road, structures, traffic signals, traffic signs, lanes, road edges (such as curbstones and guard rails), etc. as objects and presents the presentation information of the detected objects to the driver of the vehicle.

Figure 1:
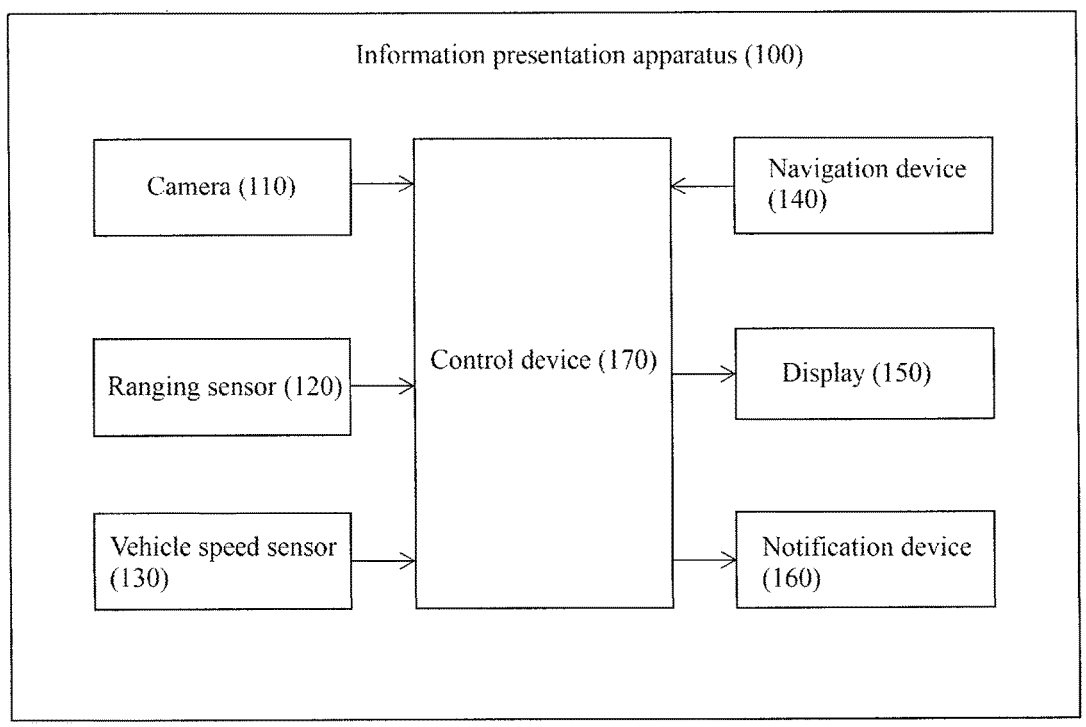
FIG. 1 is a block diagram illustrating the configuration of an information presentation apparatus according to one or more embodiments of the present invention.

FIG. 1 is a block diagram illustrating the configuration of an information presentation apparatus 100 according to one or more embodiments of the present invention. As illustrated in FIG. 1, the information presentation apparatus 100 according to one or more embodiments of the present invention comprises a camera 110, a ranging sensor 120, a vehicle speed sensor 130, a navigation device 140, a display 150, a notification device 160, and a control device 170. These devices are connected to one another via a controller area network (CAN) or other in-vehicle LAN for mutually exchanging information.

The camera 110 is composed of one or more cameras that capture images around the subject vehicle. In one or more embodiments of the present invention, the camera 110 for capturing images ahead of the subject vehicle includes a short-distance camera suitable for capturing images of objects existing at short distances from the subject vehicle, a middle-distance camera suitable for capturing images of objects existing at middle distances from the subject vehicle, and a long-distance camera suitable for capturing images of objects existing at long distances from the subject vehicle. Captured images captured by the camera 110 are output to the control device 170.

The ranging sensor 120 is composed of radars such as a front radar that detects objects ahead of the subject vehicle, a rear radar that detects objects behind the subject vehicle, and side radars that detect objects existing at sides of the subject vehicle. Ultrasonic sensors, sound wave sensors, infrared sensors, and other appropriate sensors can also be used as the ranging sensor 120. The ranging sensor 120 detects the positions of objects existing around the subject vehicle and the distances from the subject vehicle to the objects and outputs the detection results to the control device 170.

The vehicle speed sensor 130 measures the rotation speed of a drive system such as a drive shaft and detects the traveling speed of the vehicle (also referred to as a "vehicle speed," hereinafter) on the basis of the measured rotation speed. The vehicle speed information detected by the vehicle speed sensor 130 is output to the control device 170.

The navigation device 140, which includes a map database, a GPS sensor, and an orientation sensor, measures the current position of the subject vehicle and displays the map data around the measured current position on the display 150. In addition or alternatively, the navigation device 140 specifies the type of a road on which the subject vehicle travels (e.g. a parking lot, a road in an urban area, an expressway, etc.) and outputs the specified type of the road to the control device 170. The navigation device 140 may be configured to serve also as the display 150, the notification device 160, and the control device 170.

Under the control by the control device 170, the display 150 presents the presentation information about objects existing around the subject vehicle on the screen of the display 150. Examples of the display 150 include a display of the navigation device 140, a display incorporated in a rearview mirror, a display incorporated in a meter unit, and a head-up display projected on a windshield.

The notification device 160 generates sound, voice, light, vibration, etc. thereby to notify the driver that the presentation information based on a captured image and the presentation information based on an overview image are switched as described later. Examples of the notification device 160 include a speaker, a warning lamp, and a haptic device such as a handle and a seat in which a vibrator is embedded.

The control device 170 is composed of a read only memory (ROM) that stores programs for performing display control of the presentation information about the objects, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or other appropriate component can also be used as the operation circuit.

The control device 170 executes the programs stored in the ROM using the CPU thereby to achieve an information acquisition function of acquiring various travel information items, an object detection function of detecting objects existing around the subject vehicle, a vehicle speed index setting function of setting a vehicle speed index, an image type selection function of selecting the image type of a presentation image, a first image generation function of generating the presentation image on the basis of a captured image, a second image generation function of generating the presentation image on the basis of an overview image, a display function of displaying the presentation image on the display 150, and a travel control function of controlling automated driving of the subject vehicle. These functions of the control device 170 will be described below.

The control device 170 uses the information acquisition function to acquire various travel information items from the camera 110, ranging sensor 120, vehicle speed sensor 130, and navigation device 140. For example, the information acquisition function serves to acquire a captured image captured by the camera 110 from the camera 110, acquire the detection result of the ranging sensor 120 from the ranging sensor 120, acquire the traveling speed of the subject vehicle from the vehicle speed sensor 130, and acquire the positional information of the subject vehicle (including the type information of a road on which the subject vehicle travels) from the navigation device 140.

The control device 170 uses the object detection function to detect objects existing around the subject vehicle on the basis of a captured image captured by the camera 110 and the detection result of the ranging sensor 120. The object detection function also serves to detect the positions of objects and the distances from the subject vehicle to the objects on the basis of a captured image captured by the camera 110 and/or the detection result of the ranging sensor 120. The object detection function can further serve to detect the type of an object, such as a pedestrian, bicycle, motorcycle, car, obstacle on a road, structure, traffic signal, traffic sign, lane, and road edge (a curbstone, guard rail, etc), the speed limit described on a traffic sign, the signal color of a traffic signal, and other features on the basis of the color and/or shape of the object captured in a captured image.

The control device 170 uses the vehicle speed index setting function to set an index associated with the traveling speed of the subject vehicle as a vehicle speed index. In one or more embodiments of the present invention, the vehicle speed index setting function serves to set the vehicle speed index at five stages of "1" to "5." The vehicle speed index tends to be a lower numerical value in a scene in which the subject vehicle is traveling at a slower speed, while the vehicle speed index tends to be a higher numerical value in a scene in which the subject vehicle is traveling at a higher speed.

FIG. 2 is a chart illustrating an example of the relationship between various travel information items and the vehicle speed index. The vehicle speed index setting function can serve to set the vehicle speed index in accordance with the traveling speed V of the subject vehicle. For example, in the example illustrated in FIG. 2, the vehicle speed index setting function serves to set the vehicle speed index as "1" when the traveling speed V of the subject vehicle is zero or higher and lower than X1 and a determination can be made that the subject vehicle is stopped or traveling at a very slow speed. When the traveling speed V of the subject vehicle is X1 or higher and lower than X2 and a determination can be made that the subject vehicle is traveling at a slow speed, the vehicle speed index setting function serves to set the vehicle speed index as "2." Likewise, as illustrated in FIG. 2, the vehicle speed index setting function serves to set the vehicle speed index to a larger numerical value as the traveling speed V of the subject vehicle is higher. In the example illustrated in FIG. 2, the relationship among X1, X2, X3, and X4 is X1<X2<X3<X4.

In addition or alternatively, the vehicle speed index setting function can serve to set the vehicle speed index in accordance with the gear ratio of the transmission. For example, the vehicle speed index setting function serves to acquire information on the gear ratio from the transmission and make a determination which the gear ratio of the transmission corresponds to among the "first gear," "second gear," "third gear," "fourth gear," and "fifth gear or more." For example, in the example illustrated in FIG. 2, the vehicle speed index setting function serves to set the vehicle speed index as "1" when the gear ratio of the transmission is a gear ratio corresponding to the "first gear." When the gear ratio of the transmission is a gear ratio corresponding to the "second gear," the vehicle speed index setting function serves to set the vehicle speed index as "2." Likewise, as illustrated in FIG. 2, the vehicle speed index setting function serves to set the vehicle speed index to a larger numerical value as the gear ratio of the transmission is lower. When the gear ratio of the transmission can be changed by operating a shift lever, the vehicle speed index setting function may serve to set the vehicle speed index in accordance with the position of the shift lever.

In addition or alternatively, the vehicle speed index setting function can serve to set the vehicle speed index on the basis of the road type of a road on which the subject vehicle travels. For example, the vehicle speed index setting function serves to acquire the type information of a road on which the subject vehicle travels, from the navigation device 140. Then, when the subject vehicle is parked, stopped, or traveling in a "parking lot," the vehicle speed index setting function serves to determine that the subject vehicle is stopped or crawling at a reduced-speed and set the vehicle speed index as "1." When the subject vehicle is traveling on a "general municipal road excluding urban areas," the vehicle speed index setting function serves to set the vehicle speed index as "2." Likewise, as illustrated in FIG. 2, the vehicle speed index setting function can serve to set the vehicle speed index as "3" when the subject vehicle travels on an "urban road," set the vehicle speed index as "4" when the subject vehicle travels on an "arterial road," and set the vehicle speed index as "5" when the subject vehicle travels on a "motorway or expressway."

In addition or alternatively, the vehicle speed index setting function can serve to set the vehicle speed index on the basis of a limit speed Vr of the road on which the subject vehicle travels. For example, in the example illustrated in FIG. 2, the vehicle speed index setting function serves to set the vehicle speed index as "1" when the limit speed Vr of the road on which the subject vehicle travels is lower than X1. When the limit speed Vr of the road on which the subject vehicle travels is X1 or higher and lower than X2, the vehicle speed index setting function serves to set the vehicle speed index as "2." Likewise, as illustrated in FIG. 2, the vehicle speed index setting function can serve to set the vehicle speed index to a larger numerical value as the limit speed Vr of the road on which the subject vehicle travels is higher.

In addition or alternatively, the vehicle speed index setting function can serve to set the vehicle speed index in accordance with a distance D from the subject vehicle to an object. For example, in the example illustrated in FIG. 2, the vehicle speed index setting function serves to set the vehicle speed index as "1" when the distance D from the subject vehicle to the object is shorter than D1. When the distance D from the subject vehicle to the object is D1 or longer and shorter than D2, the vehicle speed index setting function serves to set the vehicle speed index as "2." Likewise, as illustrated in FIG. 2, the vehicle speed index setting function can serve to set the vehicle speed index to a larger numerical value as the distance D from the subject vehicle to the object is longer. In the example illustrated in FIG. 2, the relationship among D1, D2, D3, and D4 is D1<D2<D3<D4.

In addition or alternatively, the vehicle speed index setting function can serve to set the vehicle speed index on the basis of the traveling scene of the subject vehicle. For example, the vehicle speed index setting function serves to determine whether or not the traveling scene of the subject vehicle is a predetermined traveling scene on the basis of the traveling speed V of the subject vehicle, the traveling place of the subject vehicle (such as a parking lot, a shopping area, and a road with multiple lanes, for example), the type and number of the objects detected around the subject vehicle, etc. Then, as illustrated in FIG. 2, the vehicle speed index setting function can serve to set the vehicle speed index to a numerical value corresponding to each traveling scene.

For example, in the example illustrated in FIG. 2, when the subject vehicle is traveling in a parking lot or shopping area and a number of pedestrians and/or bicycles exist around the subject vehicle, the vehicle speed index setting function serves to determine that the traveling scene of the subject vehicle is a "stop/crawl scene." Then, as illustrated in FIG. 2, the vehicle speed index setting function can serve to set the vehicle speed index to "1" corresponding to the "stop/crawl scene." When detecting a bicycle traveling zone on a side of the subject vehicle and detecting a bicycle around the subject vehicle, the vehicle speed index setting function serves to determine that the traveling scene of the subject vehicle is a "bicycle parallel traveling scene." Then, as illustrated in FIG. 2, the vehicle speed index setting function can set the vehicle speed index to "2" corresponding to the "bicycle parallel traveling scene." When the subject vehicle is traveling on a road of two way traffic on which the subject vehicle and an oncoming vehicle can pass each other and the oncoming vehicle is traveling at 15 to 40 km/h, the vehicle speed index setting function serves to determine that the traveling scene of the subject vehicle is an "urban traveling scene." Then, as illustrated in FIG. 2, the vehicle speed index setting function can set the vehicle speed index to "3" corresponding to the "urban traffic scene." When the subject vehicle is traveling on a road having a plurality of lanes and another vehicle is traveling at 40 to 60 km/h, the vehicle speed index setting function serves to determine that the traveling scene of the subject vehicle is a "suburban traveling scene." Then, as illustrated in FIG. 2, the vehicle speed index setting function can set the vehicle speed index to "4" corresponding to the "suburban traffic scene." When the subject vehicle is traveling on a road of a plurality of lanes with no traffic signals and another vehicle is traveling at 60 km/h or higher, the vehicle speed index setting function serves to determine that the traveling scene of the subject vehicle is a "high-speed cruising scene." Then, as illustrated in FIG. 2, the vehicle speed index setting function can set the vehicle speed index to "5" corresponding to the "high-speed cruising scene."

The control device 170 uses the image type selection function to select an image type of the presentation image on the basis of the vehicle speed index which is set using the vehicle speed index setting function. Specifically, as illustrated in FIG. 3, when the vehicle speed index is "1" or "2," the image type selection function serves to select a captured image type for presenting the presentation image based on a captured image as the image type of the presentation image. Also illustrated in FIG. 3, when the vehicle speed index is "3" to "5," the image type selection function serves to select an overview image type for presenting the presentation image based on an overview image as the image type of the presentation image.

Figure 4A:
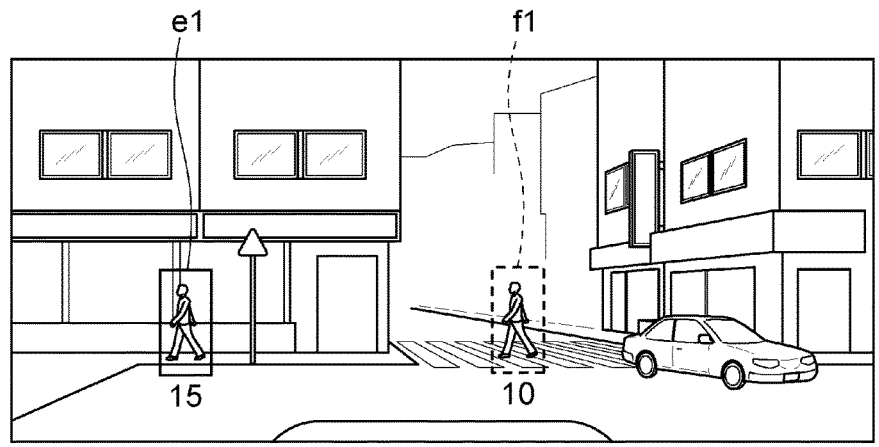
FIGS. 4A and 4B are a set of views illustrating an example of the presentation image of a captured image type and an example of the presentation image of an overview image type.
Figure 4B:
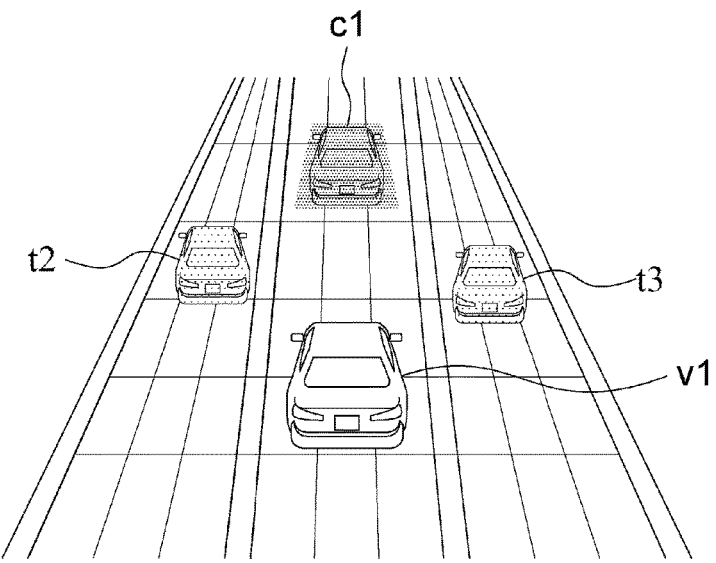

FIG. 4A is a view illustrating an example of the presentation image when the captured image type is selected while FIG. 4B is a view illustrating an example of the presentation image when the overview image type is selected. Thus, when the captured image type is selected, the presentation image based on a captured image is displayed as illustrated in FIG. 4A, while when the overview image type is selected, the presentation image based on an overview image is displayed as illustrated in FIG. 4B.

When the captured image type is selected using the image type selection function, the control device 170 uses the first image generation function to generate the presentation image on the basis of a captured image captured by the camera 110, as illustrated in FIG. 4A. A method of generating the presentation image using the first image generation function will be described below in detail.

First, the first image generation function serves to select a captured image used for generation of the presentation image on the basis of the vehicle speed index or the traveling speed V of the subject vehicle. The information presentation apparatus 100 according to one or more embodiments of the present invention includes a short-distance camera suitable for capturing images of objects existing at short distances from the subject vehicle, a middle-distance camera suitable for capturing images of objects existing at middle distances from the subject vehicle, and a long-distance camera suitable for capturing images of objects existing at long distances from the subject vehicle. For example, as illustrated in FIG. 5, when the vehicle speed index is "1," the first image generation function serves to select a captured image captured by the short-distance camera as the captured image used for generation of the presentation image. Likewise, when the vehicle speed index is "2," the first image generation function serves to select a captured image captured by the middle-distance camera as the captured image used for generation of the presentation image. The long-distance camera is used for detecting objects when the vehicle speed index is "3" or higher (i.e. when the presentation image is the overview image type).

In addition or alternatively, as illustrated in FIG. 5, the first image generation function may select a captured image captured by the short-distance camera as the captured image used for generation of the presentation image when the traveling speed V of the subject vehicle is zero or higher and lower than X1, and select a captured image captured by the middle-distance camera as the captured image used for generation of the presentation image when the traveling speed V of the subject vehicle is X1 or higher and lower than X2.

Then, the first image generation function performs a mask process for the selected captured image in accordance with the traveling speed V of the subject vehicle. FIGS. 6A and 6B are a set of views for describing the mask process for the captured image, in which FIG. 6A represents the captured image before the mask process and FIG. 6B represents the captured image after the mask process. For example, as illustrated in FIG. 6A, when the width of the captured image captured by the camera 110 is L and the mask process is performed with a mask width d, the first image generation function can serve to calculate the mask width d on the basis of the traveling speed V of the subject vehicle and an upper limit speed Vlimit.

$$\text{Mask width } d = L/2 \times V/V\text{limit} \quad (1)$$

The upper limit speed Vlimit is the upper limit of the traveling speed V when the captured image type is selected. For example, provided that the traveling speed V is less than X2, when the vehicle speed index is set to "2" and the presentation image based on the captured image is displayed, "X2" is the upper limit speed Vlimit.

Thus, the higher the traveling speed V of the subject vehicle, the wider the first image generation function serves to calculate the mask width d. Then, the first image generation function serves to perform the mask process of masking end parts of the captured image in the horizontal direction (Y-direction) by the calculated mask width d. Through this operation, when the traveling speed V of the subject vehicle is high, as illustrated in FIG. 6B, a shorter image in the horizontal direction (Y-direction) is generated as compared with the captured image captured by the camera 110. In addition or alternatively, the first image generation function can serve to mask the captured image with a mask width d in accordance with the vehicle speed index. In this case, the first image generation function serves to perform the mask process so that the mask width is widened when the vehicle speed index is "2" as compared with when the vehicle speed index is "1."

Then, the first image generation function serves to superimpose a bonnet image imitating the bonnet of the subject vehicle on the captured image for which the mask process has been performed. Specifically, as illustrated in FIG. 7A, the first image generation function serves to superimpose the bonnet image on the lower side of the captured image for which the mask process has been performed. The bonnet image is an image that is preliminarily rendered using computer graphics, for example, and can be stored in the ROM of the control device 170. In addition or alternatively, the captured image of an actual bonnet of the subject vehicle may be stored as the bonnet image in the ROM of the control device 170. FIGS. 7A-7B are each a view illustrating an example of the image in which the bonnet image is superimposed on the image after the mask process illustrated in FIG. 6B.

The first image generation function can further serve to change the size and/or shape of the bonnet image in accordance with the traveling speed V of the subject vehicle or the vehicle speed index. For example, when the traveling speed V of the subject vehicle is lower than X1, the first image generation function can serve to set the length of the bonnet image in the vertical direction (X-direction) to be relatively short as illustrated in FIG. 7A, while when the traveling speed V of the subject vehicle is not lower than X1, the first image generation function can serve to set the length of the bonnet image in the vertical direction (X-direction) to be relatively long as illustrated in FIG. 7B. In addition or alternatively, when the traveling speed V of the subject vehicle is not lower than X1, the first image generation function may serve to set the length of the upper end portion of the bonnet image (the upper base portion when the bonnet image is trapezoidal) to be relatively short. In addition or alternatively, when the vehicle speed index of the subject vehicle is "1," the first image generation function may serve to set the length of the bonnet image in the vertical direction (X-direction) to be relatively short as illustrated in FIG. 7A, while when the vehicle speed index of the subject vehicle is "2," the first image generation function may serve to set the length of the bonnet image in the vertical direction (X-direction) to be relatively long as illustrated in FIG. 7B. In the examples illustrated in FIGS. 7A-7B, a configuration is exemplified in which the size and/or shape of the bonnet image are changed in two stages, but the configuration is not limited to this. For example, the size and/or shape of the bonnet image may be changed in three or more stages. In addition or alternatively, the size and/or shape of the bonnet image may be changed continuously in accordance with the traveling speed V of the subject vehicle.

Figure 8A:
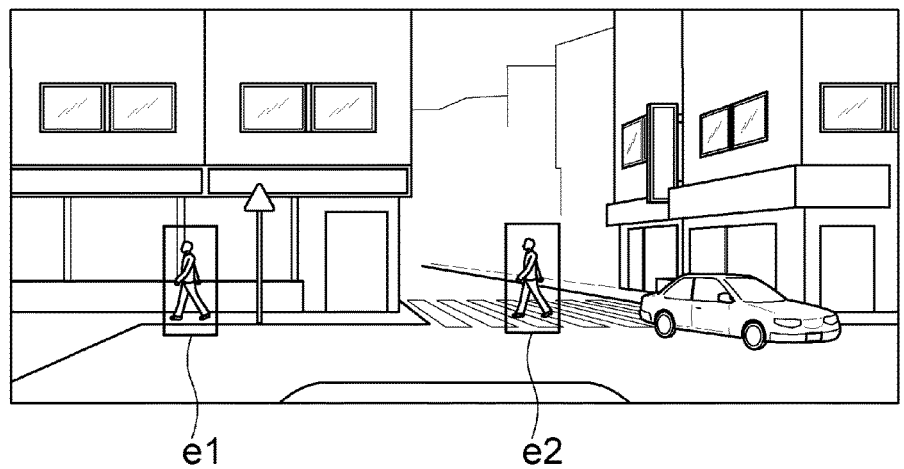
FIGS. 8A-8C are a set of views each illustrating an example of an image in which detected objects are displayed in an emphasized manner in the image illustrated in FIG. 6A.
Figure 8B:
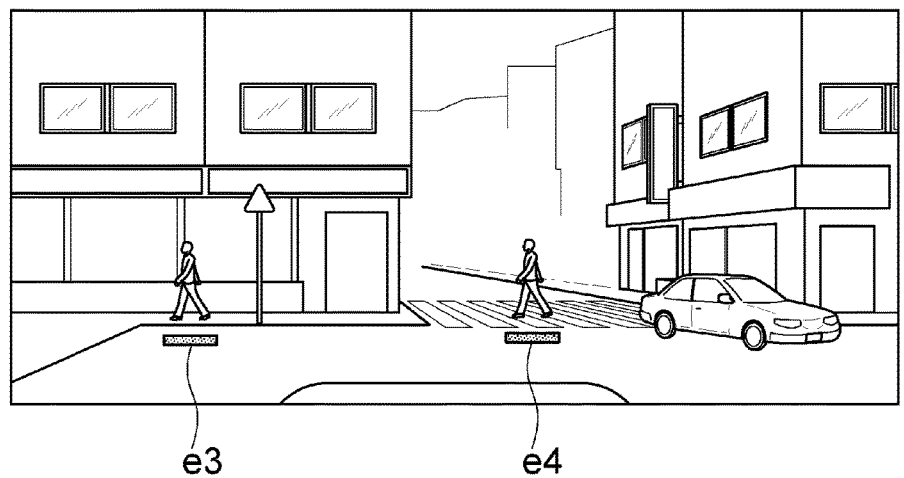
Figure 8C:
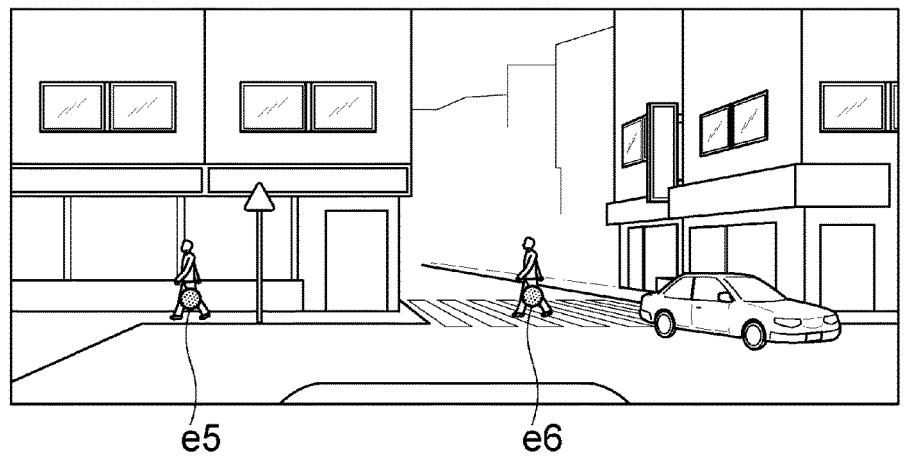

Then, the first image generation function serves to display the objects within the captured image in an emphasized manner on the basis of the detection results obtained using the object detection function. FIGS. 8A-8C are a set of views each illustrating an example of the image in which the objects are displayed in an emphasized manner in the image illustrated in FIG. 6A. For descriptive purposes, examples illustrated in FIGS. 8A-8C each exemplify a scene in which only pedestrians are detected as the objects (the same applies to FIGS. 9A-9B and 10A-10C which will be described later). In such cases, as illustrated in FIG. 8A, for example, the first image generation function can superimpose frame lines e1 and e2 around the objects detected using the object detection function (also referred to as "detected objects," hereinafter) thereby to display the detected objects in an emphasized manner. In addition or alternatively, as illustrated in FIG. 8B, for example, the first image generation function can superimpose underlines e3 and e4 beneath the detected objects thereby to display the detected objects in an emphasized manner. In addition or alternatively, as illustrated in FIG. 8C, for example, the first image generation function can superimpose circles (dots) e5 and e6 on the detected objects thereby to display the detected objects in an emphasized manner.

Figure 9A:
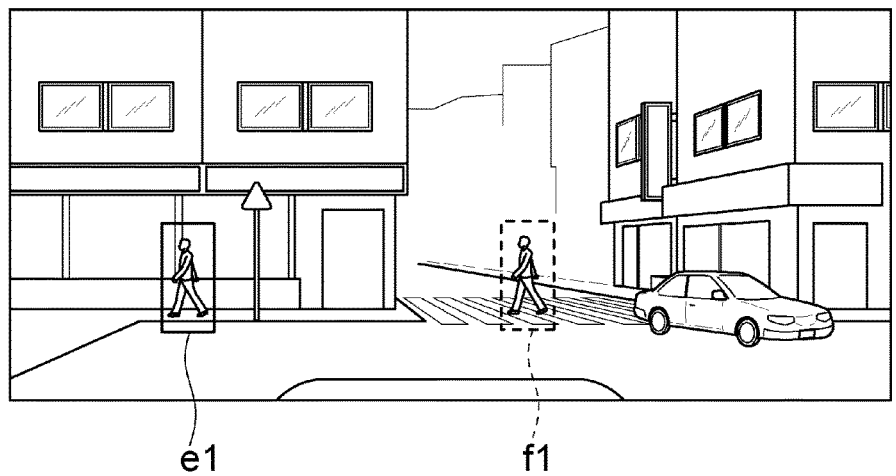
FIGS. 9A and 9B are a set of views each illustrating an example of an image in which a control object is displayed in an emphasized manner in the image illustrated in FIG. 8A.
Figure 9B:
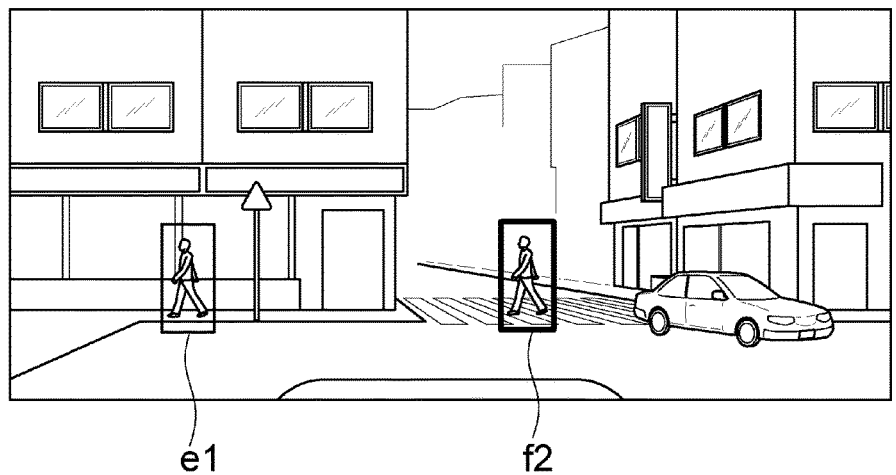

Then, the first image generation function serves to display an object targeted for the automated driving of the subject vehicle (also referred to as a "control object," hereinafter) among the detected objects detected using the object detection function, in an emphasized manner in a display form different from that of other detected objects. FIGS. 9A-9B are a set of views each illustrating an example of the image in which the control object is displayed in an emphasized manner in the image illustrated in FIG. 8A. For example, when superimposing a yellow frame line e1 (indicated by a black solid line in FIG. 9A) around the detected object as illustrated in FIG. 9A, the first image generation function can serve to superimpose a red frame line f1 (indicated by a black dashed line in FIG. 9A) around the control object thereby to display the control object in an emphasized manner in a display form different from that of other detected objects. In addition or alternatively, when superimposing a thin frame line e1 around the detected object as illustrated in FIG. 9B, the first image generation function can serve to superimpose a thick frame line f2 around the control object thereby to display the control object in an emphasized manner in a display form different from that of other detected objects.

Figure 10A:
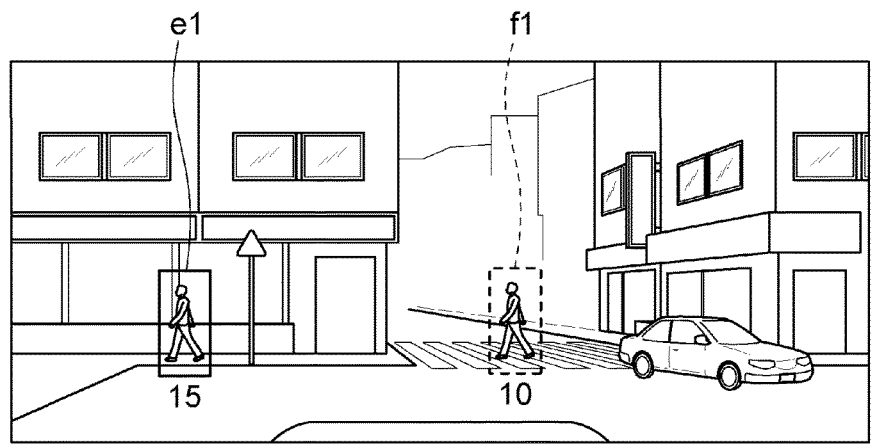
FIGS. 10A-10C are a set of views each illustrating an example of an image (presentation image based on the captured image) in which distance information from the subject vehicle to the detected objects is superimposed on the image illustrated in FIGS. 9A and 9B.
Figure 10B:
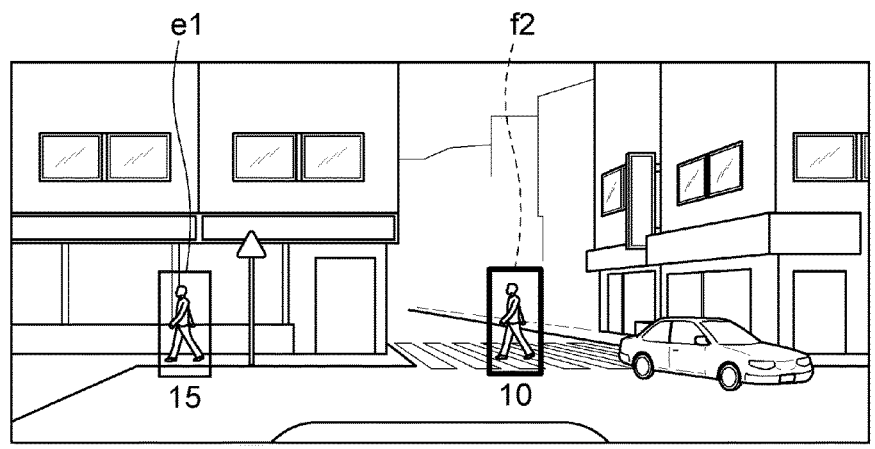
Figure 10C:
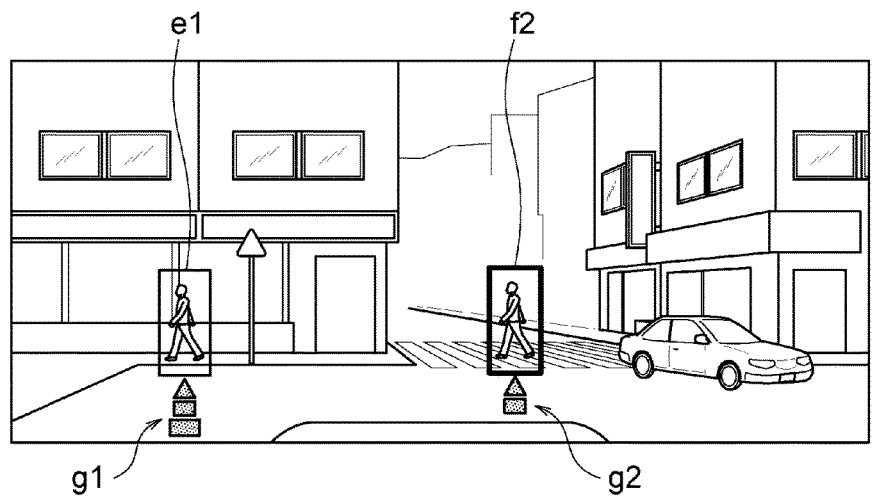

Then, the first image generation function serves to superimpose distance information from the subject vehicle to the detected objects (including the control object) on the image in which the control object is displayed in an emphasized manner. FIGS. 10A-10C are a set of views each illustrating an example of the image in which the distance information from the subject vehicle to the detected objects (including the control object) is superimposed on the image illustrated in FIGS. 9A-9B. For example, as illustrated in FIGS. 10A and 10B, the first image generation function can serve to superimpose numerical values representing the distances from the subject vehicle to the detected objects (including the control object) beneath the detected objects thereby to superimpose the distance information from the subject vehicle to the detected objects. In addition or alternatively, as illustrated in FIG. 10C, the first image generation function can serve to superimpose patterns (such as graphical patterns and icons) g1 and g2 representing the distances from the subject vehicle to the detected objects (including the control object) beneath the detected objects. In the example illustrated in FIG. 10C, the longer the distance from the subject vehicle to a detected object (including the control object), the longer the length of the pattern.

As described above, for the captured image captured by the camera 110, the first image generation function serves to perform (1) the mask process, (2) the process of superimposing a bonnet image, (3) display of the detected objects in an emphasized manner, (4) display of the control object in an emphasized manner, and (5) the process of superimposing the distance information, thereby to generate the presentation image.

The control device 170 uses the second image generation function to render an image, such as using computer graphics, thereby to generate an overview image as if the subject vehicle is viewed from above. Then, the second image generation function serves to generate the presentation image on the basis of the generated overview image. A method of generating the presentation image using the second image generation function will be described below in detail.

Figure 11A:
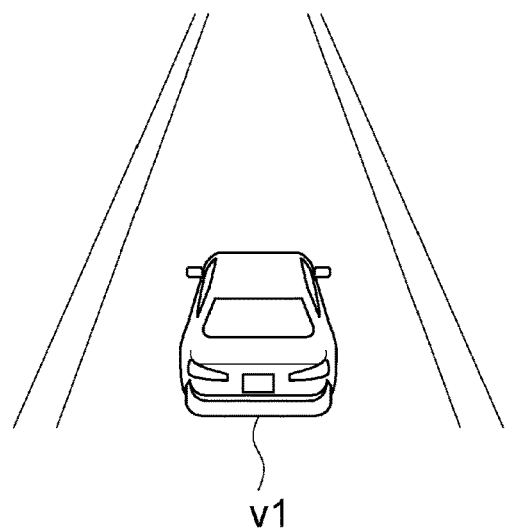
FIGS. 11A-11C are a set of views each illustrating an example of an overview image rendered on the basis of the vehicle speed index.
Figure 11B:
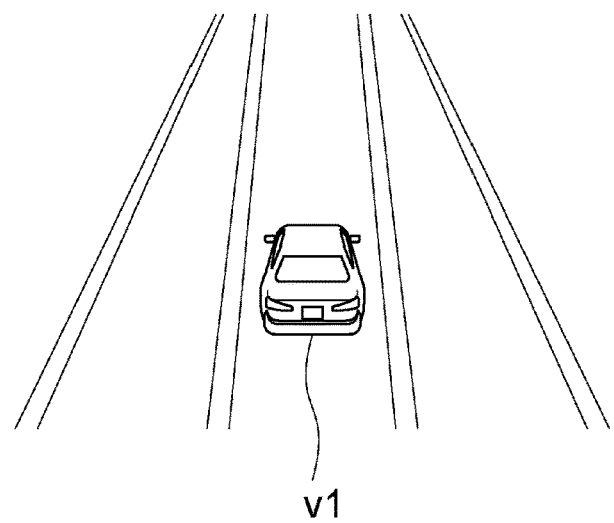
Figure 11C:
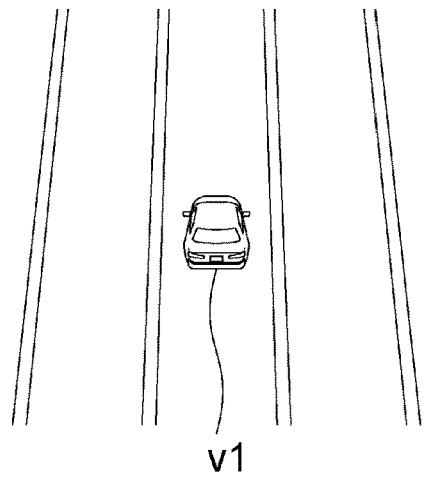

First, as illustrated in FIGS. 11A-11C, the second image generation function serves to render the overview image with a depression angle in accordance with the vehicle speed index. For example, when the vehicle speed index is "3," the second image generation function serves to render the overview image with a relatively small depression angle as illustrated in FIG. 11A. When the vehicle speed index is "4," the second image generation function serves to render the overview image with a medium depression angle as illustrated in FIG. 11B, and when the vehicle speed index is "5," the second image generation function serves to render the overview image with a relatively large depression angle as illustrated in FIG. 11C. Thus, the second image generation function renders the overview image with a larger depression angle as the vehicle speed index is larger. Then, the second image generation function serves to render an icon representing the subject vehicle V1 on the center or beneath the center of the overview image. FIGS. 11A-11C are a set of views each illustrating an example of the overview image rendered on the basis of the vehicle speed index. FIGS. 11A-11C illustrate examples each exemplifying the overview image rendered in a scene in which the subject vehicle V1 travels on a three-lane road, but when a determination can be made that the scene is a scene in which the subject vehicle V1 travels on a two-lane road, such as using the camera 110, ranging sensor 120, navigation device 140, etc., an overview image can be rendered which represents the scene in which the subject vehicle V1 travels on the two-lane road.

Figure 12A:
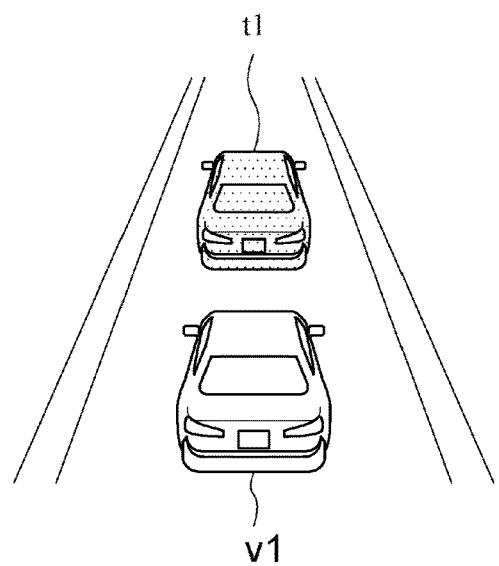
FIGS. 12A-12C are a set of views each illustrating an example of an image in which one or more detected objects are arranged on the image illustrated in FIGS. 11A-11C.
Figure 12B:
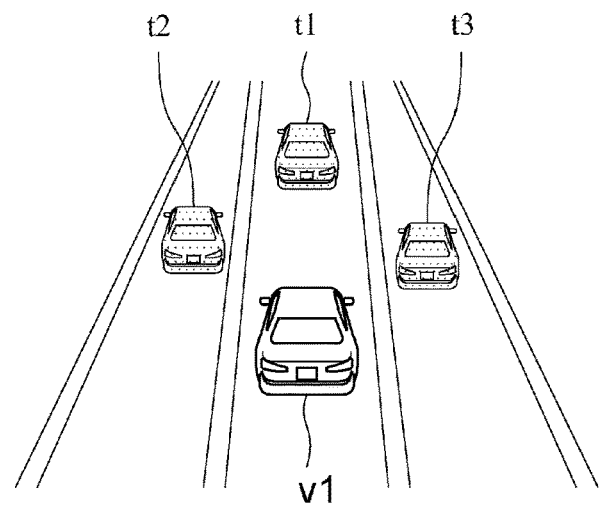
Figure 12C:
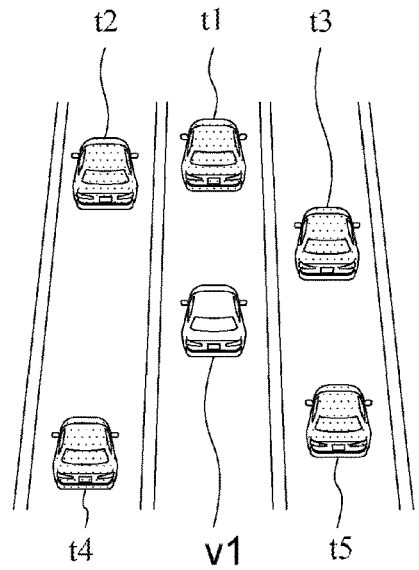

Then, as illustrated in FIGS. 12A-12C, the second image generation function serves to arrange one or more icons representing the detected objects detected using the object detection function on the rendered overview image. For example, the second image generation function serves to acquire information on the relative positions of the detected objects and the relative distances from the detected objects using the object detection function. Then, as illustrated in FIGS. 12A-12C, the second image generation function serves to arrange the icons representing the detected objects at positions on the overview image corresponding to the actual positional relationships between the subject vehicle V1 and the detected objects. For example, in the examples illustrated in FIGS. 12A-12C, another vehicle t1 is traveling ahead of the subject vehicle V1 and, therefore, also on the overview image, an icon representing the other vehicle t1 is disposed ahead of the icon representing the subject vehicle V1.

In one or more embodiments of the present invention, as illustrated in FIGS. 12A-12C, the overview image is rendered such that the subject vehicle is viewed from more above as the vehicle speed index is larger. Accordingly, the larger the vehicle speed index, the wider the display range in which the detected objects are displayed. For example, only the detected object t1 is displayed in the overview image of FIG. 12A because the depression angle is relatively small, detected objects t1 to t3 are displayed in the overview image of FIG. 12B because the depression angle is a medium angle, and detected object t1 to t5 are displayed in the overview image of FIG. 12C because the depression angle is relatively large. FIGS. 12A-12C are views illustrating examples of the images in which the detected objects are arranged on the overview images illustrated in FIGS. 11A-11C, respectively.

Figure 13A:
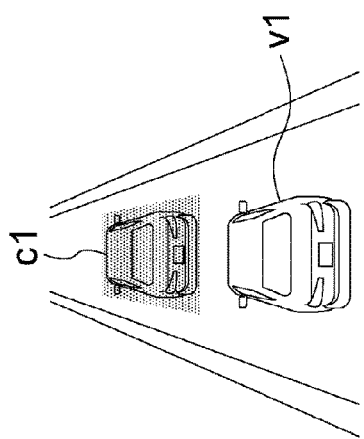
FIGS. 13A-13F are a set of views each illustrating an example of an image in which the control object is displayed in an emphasized manner in the image illustrated in FIGS. 12A-12C.
Figure 13B:
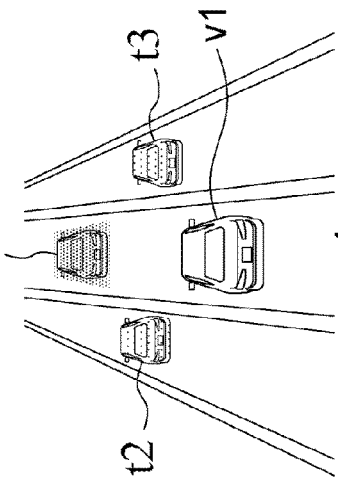
Figure 13C:
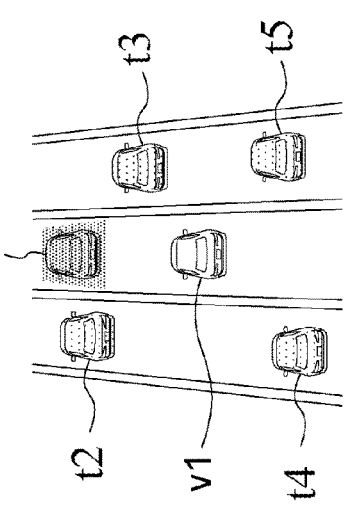
Figure 13D:
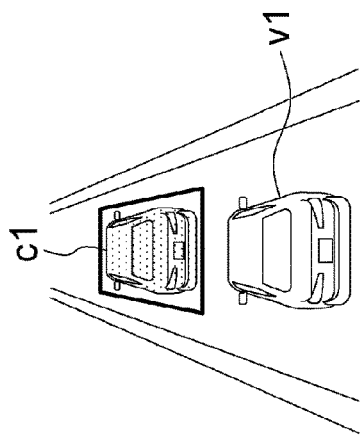
Figure 13E:
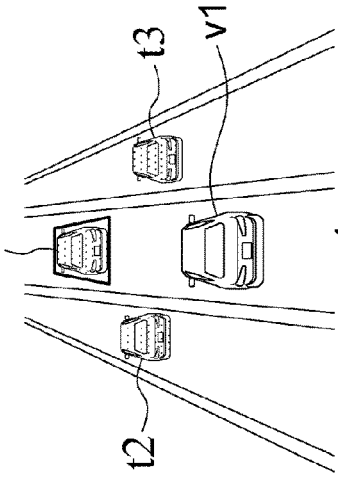
Figure 13F:
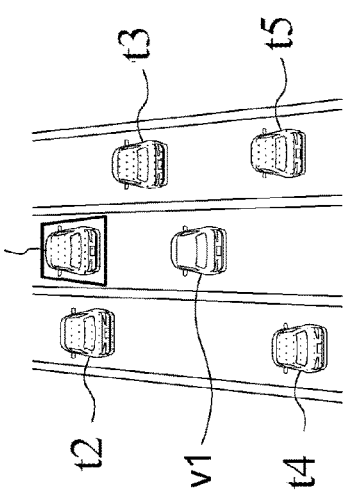
Figure 14A:
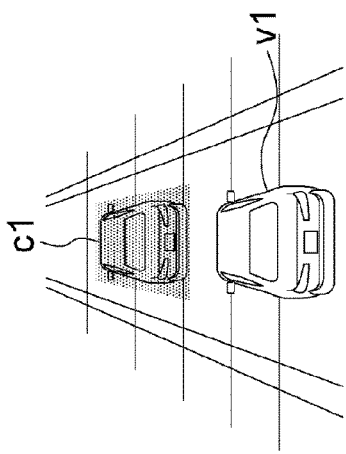
FIGS. 14A-14F are a set of views each illustrating an example of an image (presentation image based on an overview image) in which distance guide lines are superimposed on the image illustrated in FIGS. 13A-13F.
Figure 14B:
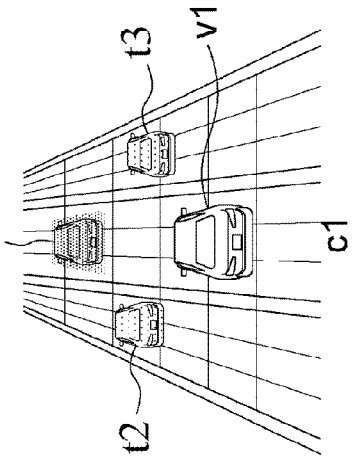
Figure 14C:
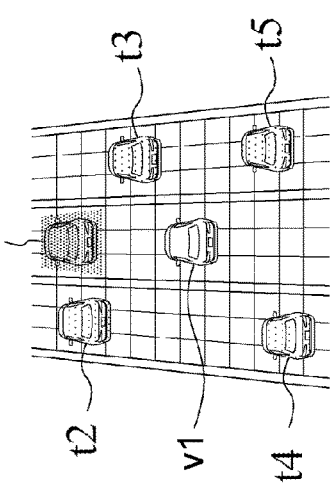
Figure 14D:
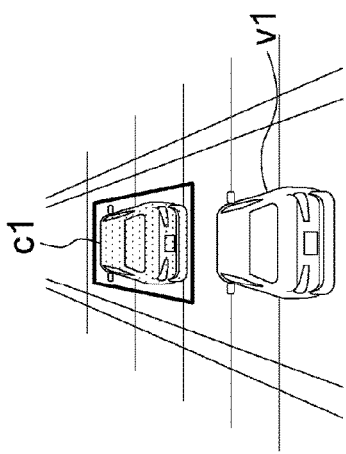
Figure 14E:
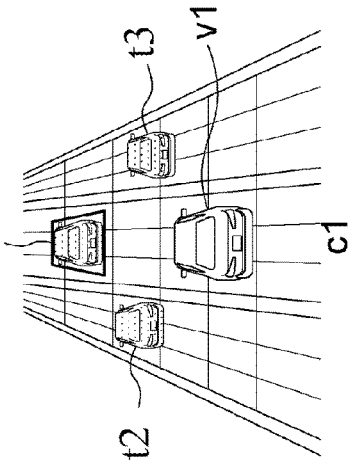
Figure 14F:
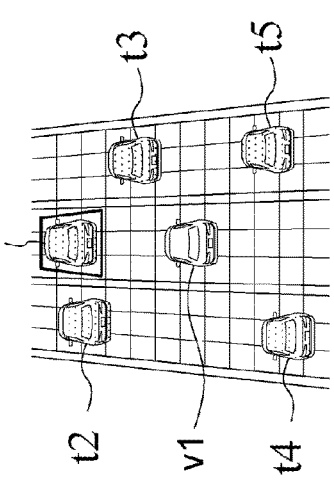

Then, as illustrated in FIGS. 13A-13F, the second image generation function serves to display the control object in an emphasized manner on the overview image in which the detected objects are arranged. FIGS. 13A-13F are a set of views each illustrating an example of the image in which the control object is displayed in an emphasized manner in the image illustrated in FIGS. 12A-12C. For example, as illustrated in FIGS. 13A-13C, the second image generation function can display the entire icon representing a control object c1 among the detected objects in yellow color (indicated by dark gray in the example illustrated in FIGS. 13A-13F) thereby to display the control object in an emphasized manner in a display form different from that of the detected objects. In addition or alternatively, as illustrated in FIGS. 13D-13F, the second image generation function can superimpose a red frame line (indicated by a black frame line in the example illustrated in FIGS. 13A-13F) around the icon representing the control object, thereby to display the control object in an emphasized manner.

Then, as illustrated in FIGS. 14A-14F, the second image generation function serves to superimpose distance guide lines on the overview image in which the control object is displayed in an emphasized manner. FIGS. 14A-14F is a set of views each illustrating an example of the image in which the distance guide lines are superimposed on the image illustrated in FIGS. 13A-13F. The second image generation function can change the distance represented by the distance guide lines, on the basis of the distance between the subject vehicle and another vehicle. For example, when the inter-vehicular distance between the subject vehicle and another vehicle is short, the second image generation function can reduce the distance represented by the distance guide lines.

Thus, the second image generation function serves to perform (1) rendering of the overview image with a depression angle in accordance with the vehicle speed index, (2) arrangement of the detected objects, (3) display of the control object in an emphasized manner, and (4) the superimposition process for the distance guide lines, thereby to generate the presentation image.

The control device 170 uses the display function to transmit the image data of the presentation image generated using the first image generation function or the second image generation function to the display 150 and display the presentation image on the screen of the display 150. This allows the presentation image to be presented to the driver.

The control device 170 uses the travel control function to control the automated driving of the subject vehicle. For example, the travel control function can serve to detect lane marks of a lane in which the subject vehicle travels (also referred to as a "subject vehicle lane," hereinafter) on the basis of the detection results of the camera 110 and/or the ranging sensor 120 and perform lane keeping control to control a travel position of the subject vehicle in the road width direction so that the subject vehicle travels in the subject vehicle lane. In this case, the travel control function can serve to control the operation of the steering actuator and the like so that the subject vehicle travels at an appropriate travel position. In addition or alternatively, the travel control function can serve to perform the follow-up travel control to automatically follow a preceding vehicle with a certain distance from the preceding vehicle. In this case, the travel control function can serve to control the operation of the drive mechanism, such as the engine and the brake, so that the subject vehicle travels with a constant distance between the subject vehicle and the preceding vehicle. In addition or alternatively, the travel control function serves to control the travel of the subject vehicle on the basis of the control object specified using the object detection function. For example, the travel control function serves to control the steering actuator, engine, brake, and other components so as to avoid the control object or stop before the control object.

Figure 15:
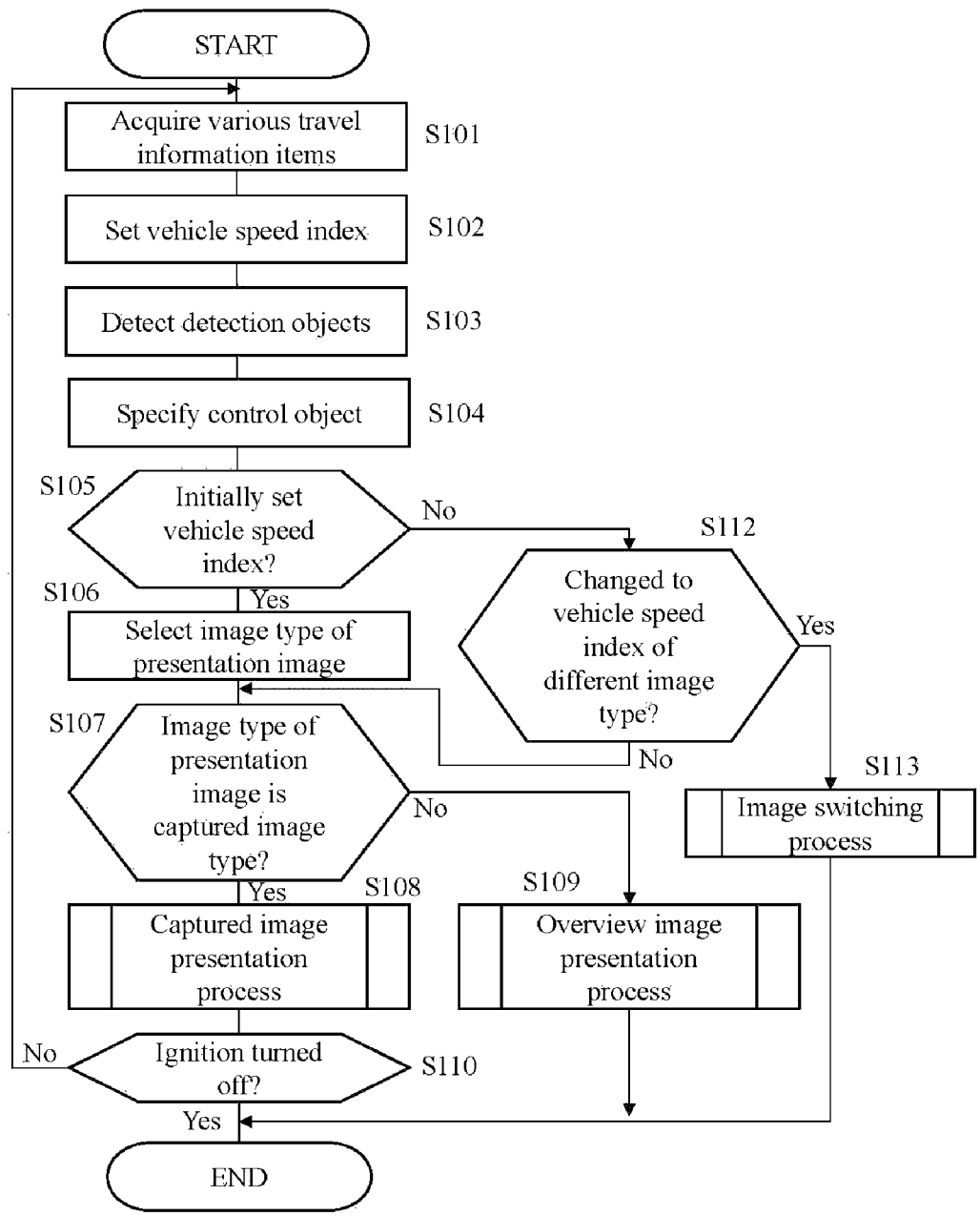
FIG. 15 is a flowchart illustrating an example of the information presentation process according to one or more embodiments of the present invention.

The information presentation process according to one or more embodiments of the present invention will then be described with reference to FIG. 15. FIG. 15 is a flowchart illustrating the information presentation process according to one or more embodiments of the present invention. The information presentation process described below is executed by the control device 170. The information presentation process described below is started when the ignition is turned on, and repeatedly executed until the ignition is turned off.

First, in step S101, the information acquisition function serves to acquire various travel information items, such as the captured image captured by the camera 110, the detection results of the ranging sensor 120, the traveling speed V of the subject vehicle detected by the vehicle speed sensor 130, and the positional information of the subject vehicle detected by the navigation device 140. Then, in step S102, the vehicle speed index setting function serves to set the vehicle speed index, as illustrated in FIG. 2, on the basis of the various travel information items acquired in step S101.

In step S103, the object detection function serves to detect objects existing around the subject vehicle as the detected objects on the basis of the captured image and the detection results of the ranging sensor 120 acquired in step S101. In addition, in step S104, the object detection function serves to specify an object targeted for the automated driving control among the detected objects as the control object.

In step S105, the image type selection function serves to determine whether or not the latest process of step S102 (the process of step S102 executed in the present processing) is the initial setting process for the vehicle speed index. That is, in step S105 immediately after the ignition is turned on and the information presentation process of FIG. 15 is started, the vehicle speed index is not set until the latest process of step S102; therefore, a determination is made that the latest process of step S102 is the initial setting process for the vehicle speed index, and the routine proceeds to step S106. On the other hand, after the vehicle speed index is set in step S102, when a determination of step S110 is made that the ignition is turned on, the routine returns to step S101, and then the process of step S102 is performed again, a determination is not made that the latest process of step S102 is the initial setting process for the vehicle speed index, and the routine proceeds to step S112.

In step S106, the image type selection function serves to select an image type of the presentation image on the basis of the vehicle speed index set in step S102. Then, in step S107, the control device 170 determines whether the image type of the presentation image selected in step S206 is the captured image type or the overview image type. When the image type of the presentation image is the captured image type, the routine proceeds to step S108, while when the image type of the presentation image is the overview image type, the routine proceeds to step S109.

Figure 16:
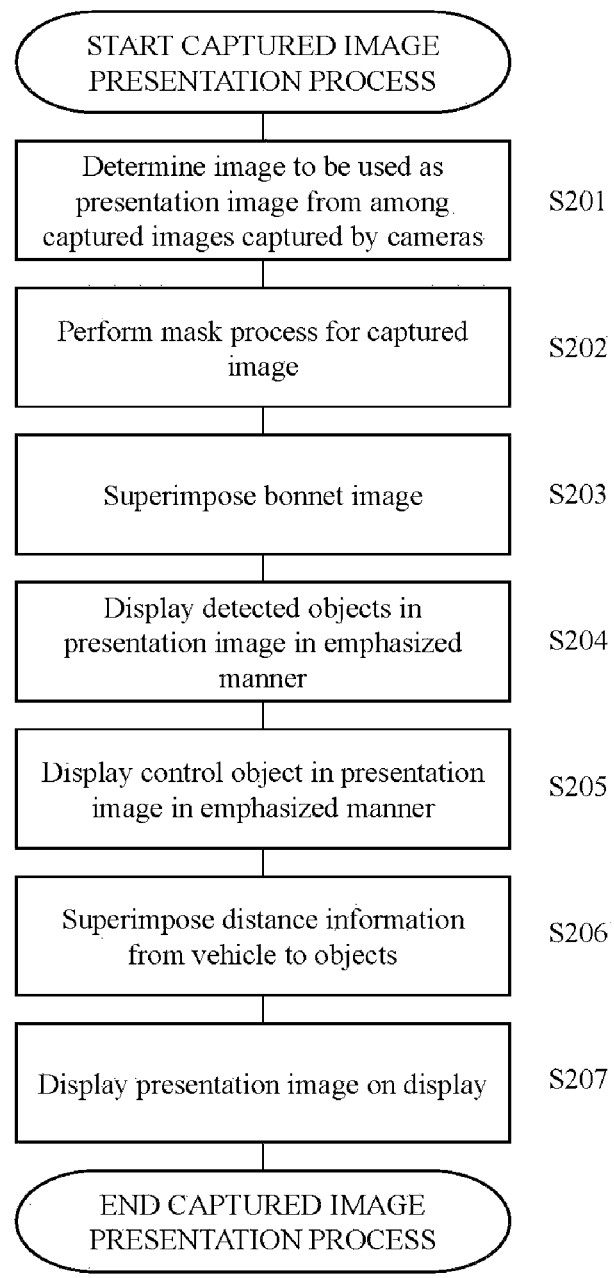
FIG. 16 is a flowchart illustrating a captured image presentation process of step S108.

In step S108, a captured image presentation process is performed for generating the presentation image on the basis of the captured image captured by the camera 110 and presenting the presentation image based on the captured image. FIG. 16 is a flowchart illustrating the captured image presentation process illustrated in step S108. The captured image presentation process of step S108 will be described below with reference to FIG. 16.

First, in step S201, the first image generation function serves to determine a captured image used for generation of the presentation image from among the captured images captured by a plurality of cameras 110. For example, as illustrated in FIG. 5, the first image generation function can serve to select the captured image used for generation of the presentation image in accordance with the traveling speed V of the subject vehicle or the vehicle speed index.

In step S202, the first image generation function serves to perform the mask process for the captured image selected in step S201. For example, as illustrated in FIGS. 6A and 6B, the first image generation function can mask the end parts of the captured image in the horizontal direction (Y-direction) by the mask width d in accordance with the traveling speed V of the subject vehicle. Through this operation, as illustrated in FIG. 6B, the captured image for which the mask process is performed is generated on the basis of the captured image illustrated in FIG. 6A.

In step S203, as illustrated in FIGS. 7A-7B, the first image generation function serves to superimpose the bonnet image on the captured image for which the mask process is performed in step S202. The first image generation function can also serve to change the size and/or shape of the bonnet image and superimpose the bonnet image on the captured image on the basis of the traveling speed V of the subject vehicle or the vehicle speed index.

In step S204, the first image generation function serves to display the detected objects in an emphasized manner on the captured image on which the bonnet image is superimposed in step S203. For example, as illustrated in FIGS. 8A-8C, marks such as frame lines, underlines, and circles (dots) are superimposed on the detected objects detected in step S103 thereby to display the detected objects in an emphasized manner.

In step S205, the first image generation function serves to display the control object in a further emphasized manner on the captured image in which the detected objects are displayed in an emphasized manner in step S204. For example, as illustrated in FIGS. 9A-9B, the first image generation function can serve to superimpose some mark, such as a frame line, which is in a display form different from that of other detected objects, on the control object specified in step S104 thereby to display the control object in an emphasized manner in the display form different from that of other detected objects.

In step S206, the first image generation function serves to superimpose distance information from the subject vehicle to the detected objects (including the control object) on the captured image in which the control object is displayed in an emphasized manner in step S205. For example, as illustrated in FIGS. 10A and 10B, the first image generation function can serve to superimpose the distance information of the detected objects acquired in step S103 beneath the detected objects.

Thus, in steps S202 to S206, the captured image selected in step S201 undergoes the mask process, the process of superimposing the bonnet image, display of the detected objects in an emphasized manner, display of the control object in an emphasized manner, and the process of superimposing the distance information, and the presentation image is thereby generated. Then, in step S207, the display function serves to display the presentation image generated in step S206 on the screen of the display 150.

After the presentation image is displayed in step S207, the routine proceeds to step S110 of FIG. 15. In step S110, the control device 170 determines whether or not the ignition is turned off, and the information presentation process illustrated in FIG. 15 is repeated until the ignition is turned off. When the ignition is turned off, the information presentation process illustrated in FIG. 15 is ended.

Figure 17:
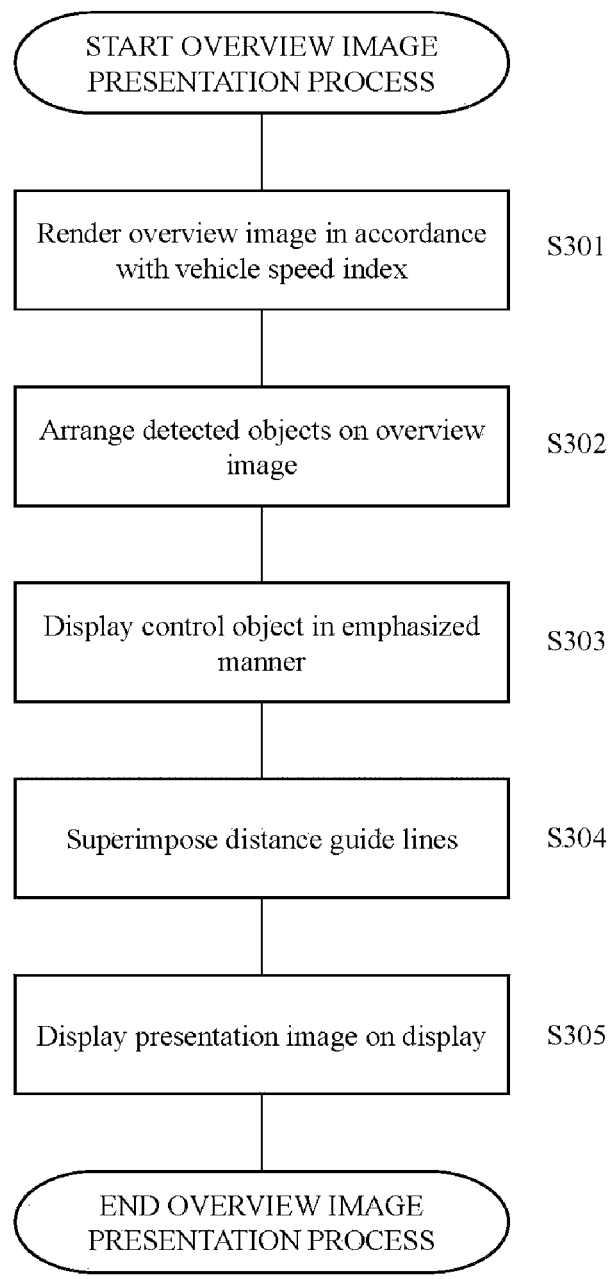
FIG. 17 is a flowchart illustrating an overview image presentation process of step S109.

When, in step S107, a determination is made that the image type of the presentation image is the overview image type, the routine proceeds to step S109. In step S109, an overview image presentation process is performed for generating the presentation image on the basis of the overview image rendered using computer graphics or the like and presenting the presentation image based on the generated overview image. FIG. 17 is a flowchart illustrating the overview image presentation process illustrated in step S109. The overview image presentation process of step S109 will be described below with reference to FIG. 17.

First, in step S301, as illustrated in FIGS. 11A-11C, the second image generation function serves to render the overview image with a depression angle in accordance with the vehicle speed index. That is, the second image generation function serves to determine the depression angle of the overview image on the basis of the vehicle speed index set in step S102 and render the overview image with the determined depression angle as illustrated in FIGS. 11A-11C.

In step S302, the second image generation function serves to arrange one or more icons representing the detected objects on the overview image rendered in step S301. Specifically, as illustrated in FIGS. 12A-12C, the second image generation function serves to arrange the icons representing the detected objects detected in step S103 at positions on the overview image corresponding to the actual positional relationships between the subject vehicle V1 and the detected objects.

In step S303, as illustrated in FIGS. 13A-13F, the second image generation function serves to display the control object in an emphasized manner on the overview image in which the detected objects are arranged in step S302. Further, as illustrated in FIGS. 14A-14F, the second image generation function serves to superimpose the distance guide lines on the overview image in which the control object is display in an emphasized manner in step S303.

Thus, in steps S302 to S304, the overview image rendered in step S301 undergoes arrangement of the detected objects, display of the control object in an emphasized manner, and the superimposition process for the distance guide lines, and the presentation image is thereby generated. Then, in step S305, the display function serves to display the presentation image generated in step S304 on the screen of the display 150.

Referring again to step S105 of FIG. 15, when a determination is made that the setting of the vehicle speed index in step S102 is not the initial setting of a vehicle speed index, that is, when the vehicle speed index is set in the previous process, the routine proceeds to step S112.

In step S112, the display function serves to determine whether or not the vehicle speed index changes to a vehicle speed index with which the image type of the presentation image is different. In one or more embodiments of the present invention, when the vehicle speed index is "1" or "2," the captured image type is selected as the image type of the presentation image, while when the vehicle speed index is "3" to "5," the overview image type is selected as the image type of the presentation image. Accordingly, when the vehicle speed index changes from "2" to "3" and the image type of the presentation image changes from the "captured image type" to the "overview image type," the display function serves to determine that the vehicle speed index changes to a vehicle speed index with which the image type of the presentation image is different. Likewise, when the vehicle speed index changes from "3" to "2" and the image type of the presentation image changes from the "overview image type" to the "captured image type," the display function serves to determine that the vehicle speed index changes to a vehicle speed index with which the image type of the presentation image is different.

When a determination is made that the vehicle speed index changes to a vehicle speed index with which the image type of the presentation image is different, the routine proceeds to step S113. When a determination is made that the vehicle speed index does not change to a vehicle speed index with which the image type of the presentation image is different, the routine proceeds to step S107 from which the above-described processes of step S107 to S110 are performed.

Figure 18:
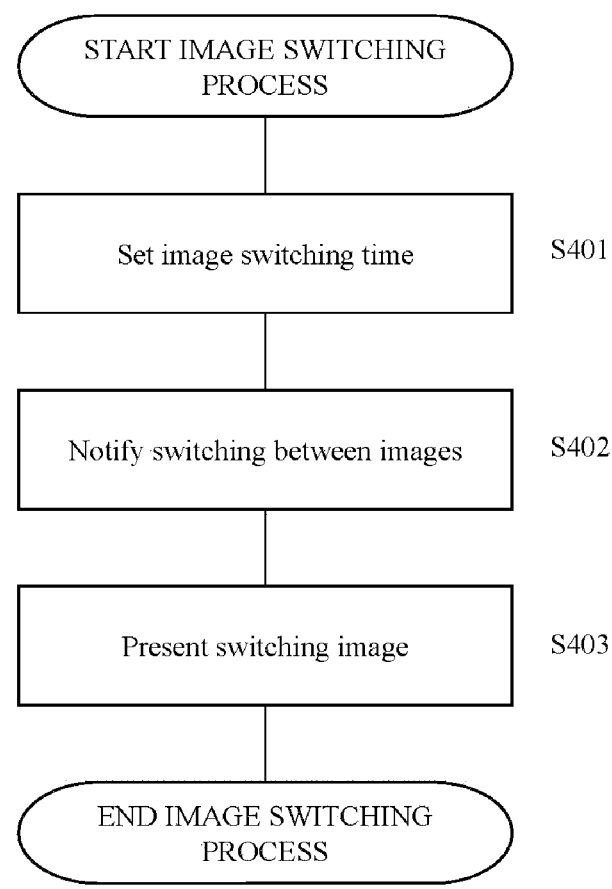
FIG. 18 is a flowchart illustrating an image switching process of step S113.

In step S113, the image type of the presentation image is changed and an image switching process is therefore performed for switching between the presentation image based on the captured image and the presentation image based on the overview image. FIG. 18 is a flowchart illustrating the image switching process illustrated in step S113. The image switching process of step S113 will be described below with reference to FIG. 18.

In step S401, the display function serves to set a switching time for switching between the presentation image based on the captured image and the presentation image based on the overview image. For example, the display function can serve to set a predetermined time (e.g. one second) as the switching time. In addition or alternatively, the display function can serve to set the switching time on the basis of the acceleration of the subject vehicle. For example, the display function may shorten the switching time as the acceleration of the subject vehicle is higher.

In step S402, the display function serves to perform a notification process of notifying the driver that the presentation image based on the captured image and the presentation image based on the overview image will be switched. For example, the display function can serve to output an alarm sound and/or a guidance voice representing the switching between the presentation images from the speaker as the notification device 160 or vibrate a haptic device such as a handle and seat in which a vibrator is embedded, thereby to allow the driver to perceive the switching between the presentation images even when the driver does not pay attention to the display 150.

In step S403, the display function serves to display a switching image. As illustrated in FIGS. 19 and 20, the display function serves to display an animation image that transitions from the presentation image based on the captured image to the presentation image based on the overview image or an animation image that transitions from the presentation image based on the overview image to the presentation image based on the captured image, as the switching image on the display 150. The display function serves to display the animation of the switching image over the image switching time set in step S401. Through this operation, the presentation image based on the captured image and the presentation image based on the overview image are switched over the image switching time.

Figure 19A:
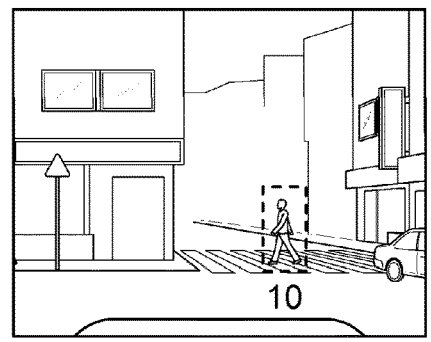
FIGS. 19A-19D are a set of views illustrating an example of a switching image from the presentation image based on a captured image to the presentation image based on an overview image.
Figure 19B:
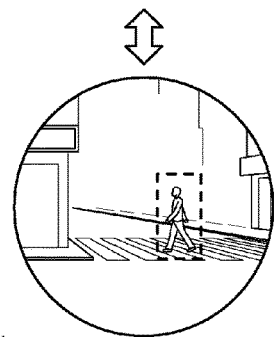
Figure 19C:
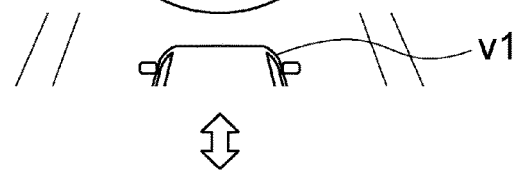
Figure 19D:
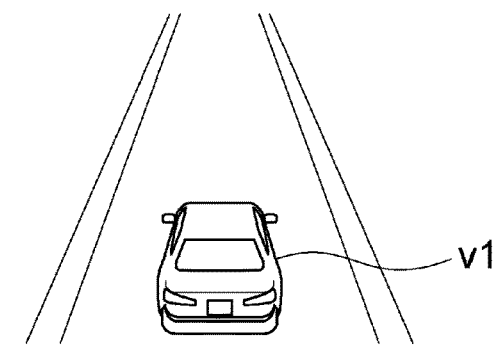

FIGS. 19A-19D are a set of views illustrating an example of the switching image when the presentation image based on the captured image transitions to the presentation image based on the overview image. When the presentation image based on the captured image transitions to the presentation image based on the overview image, first, as illustrated in FIGS. 19B and 19C, the display function serves to gradually reduce the presentation image based on the captured image illustrated in FIG. 19A from the outside to the center. While reducing the presentation image based on the captured image, as illustrated in FIGS. 19B and 19C, the display function also serves to display the presentation image based on the overview image so that it rises from below the display 150. As a result, as illustrated in FIG. 19D, the presentation image based on the captured image disappears and only the presentation image based on the overview image is displayed on the screen of the display 150.

Figure 20A:
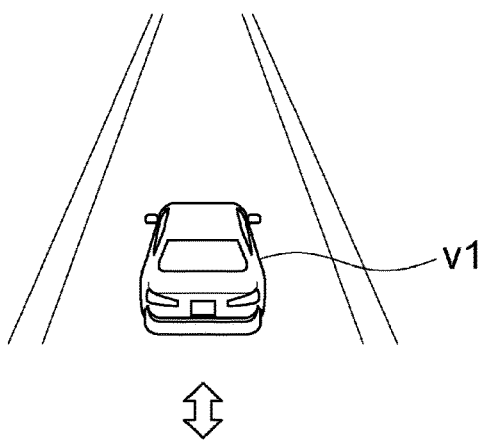
FIGS. 20A-20D are a set of views illustrating an example of a switching image from the presentation image based on an overview image to the presentation image based on a captured image.
Figure 20B:
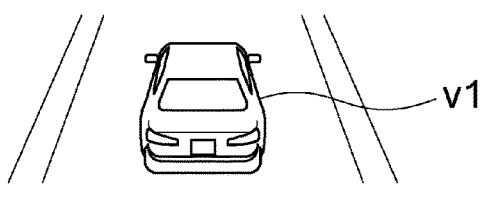
Figure 20C:
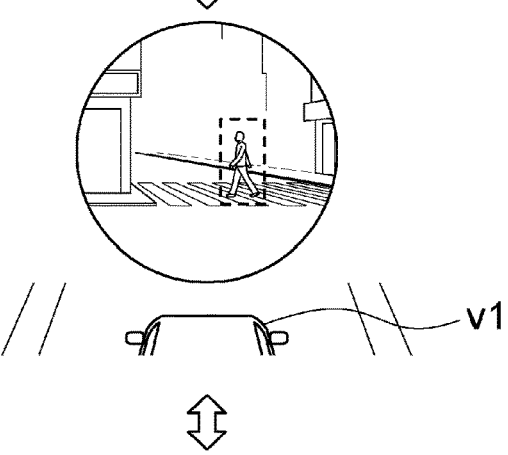
Figure 20D:
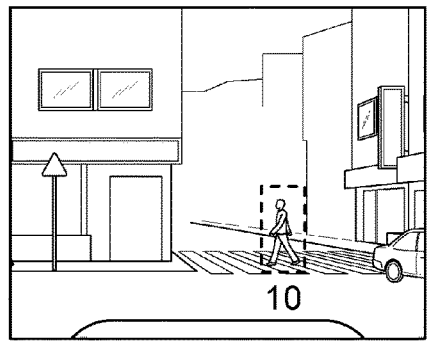

FIGS. 20A-20D are a set of views illustrating an example of the switching image when the presentation image based on the overview image transitions to the presentation image based on the captured image. When the presentation image based on the overview image transitions to the presentation image based on the captured image, first, as illustrated in FIGS. 20B and 20C, the display function serves to display the presentation image based on the overview image illustrated in FIG. 20A so that it disappears below the display 150 as illustrated in FIGS. 20B and 20C. While displaying the presentation image based on the overview image so that it disappears below the display 150, as illustrated in FIGS. 20B and 20C, the display function also serves to display the presentation image based on the captured image so that it gradually increase from the center of the display 150. As a result, as illustrated in FIG. 20D, the presentation image based on the overview image disappears and only the presentation image based on the captured image is displayed on the screen of the display 150.

The information presentation process according to one or more embodiments of the present invention is carried out as the above. Then, with reference to FIGS. 21A-21F, the relationship between the vehicle speed index and the transition between the presentation images displayed on the screen of the display 150 will be described. FIGS. 21A-21F are a set of views illustrating an example of the relationship between the vehicle speed index and the transition between the presentation images.

Figure 21A:
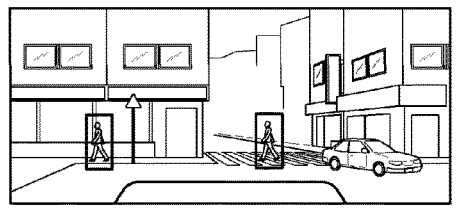
FIGS. 21A-21F are a set of views illustrating an example of the relationship between the vehicle speed index and transition between the presentation images.
Figure 21B:
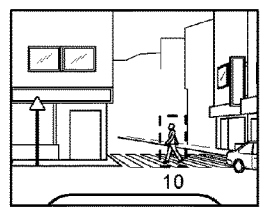
Figure 21C:
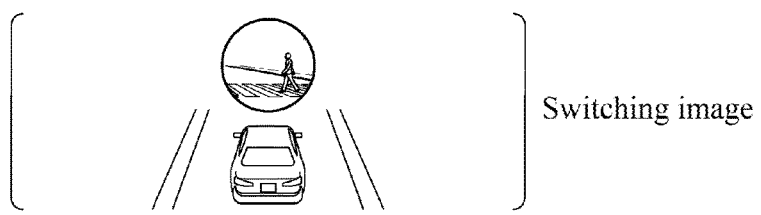
Figure 21D:
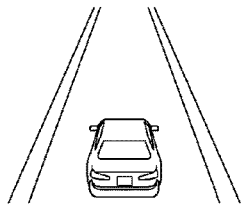
Figure 21E:
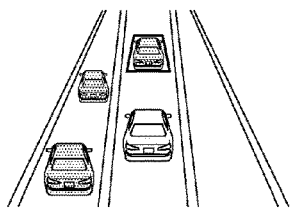
Figure 21F:
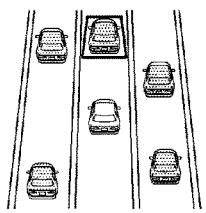

For example, when the vehicle speed index is "1," the presentation image based on the captured image is displayed as illustrated in FIG. 21A. When the vehicle speed index changes from "1" to "2," the presentation image based on the captured image is displayed in the same manner, but as illustrated in FIG. 21B, the presentation image is displayed such that the right and left end parts are masked by the mask process as compared with the case in which the vehicle speed index is "1." When the vehicle speed index further changes from "2" to "3," first, as illustrated in FIG. 21C, the switching image is displayed and the image switching process is performed. Then, as illustrated in FIG. 21D, the presentation image based on the overview image is displayed. When the vehicle speed index changes from "3" to "4," as illustrated in FIG. 21E, the presentation image based on the overview image with a larger depression angle is presented. When the vehicle speed index changes from "4" to "5," as illustrated in FIG. 21F, the presentation image based on the overview image with the largest depression angle is presented. Also when the vehicle speed index decreases, the presentation image is displayed in accordance with each vehicle speed index, and when the vehicle speed index changes from "3" to "2," the switching image is displayed and the image switching process is performed.

The presentation image may transition in accordance with the vehicle speed index only when the automated driving control is carried out. In this case, when the automated driving control is canceled, the presentation image transitions to that illustrated in FIG. 21D regardless of the vehicle speed index, and the presentation image illustrated in FIG. 21D is presented until the automated driving control is resumed.

As described above, the information presentation apparatus 100 according to one or more embodiments of the present invention displays the presentation image based on a captured image when the vehicle speed index is low, and displays the presentation image based on an overview image when the vehicle speed index is high. When the vehicle speed index is low, the subject vehicle may travel at a relatively low speed on a parking lot, a general municipal road, or the like and a number of pedestrians, bicycles, traffic signals, etc. are liable to exist around the subject vehicle. In such a case, the obstacles such as pedestrians, bicycles, and traffic signals are presented in an actual captured image, and the driver can thereby appropriately perceive whether or not the obstacles such as pedestrians, bicycles, and traffic signals can be detected, as compared with the overview image. The case in which the traveling speed of the subject vehicle is high represents a scene in which the subject vehicle travels on a general road or an expressway, and other vehicle traveling are liable to exist around the subject vehicle. In such a case, the presentation image based on the overview image can be displayed thereby to allow the driver to appropriately perceive the traveling state of other vehicles around the subject vehicle. In particular, in one or more embodiments of the present invention, the overview image is rendered, such as using computer graphics. Thus, as compared with the case of the captured image, the traveling state of other vehicles around the subject vehicle can be displayed in one screen, and the information on the objects to be displayed on the screen can be narrowed down. The driver can therefore appropriately perceive the information on other objects traveling around the subject vehicle, which the driver needs.

In one or more embodiments of the present invention, the vehicle speed index is set lower as the traveling speed V of the subject vehicle is lower, while the vehicle speed index is set higher as the traveling speed V of the subject vehicle is higher. In addition or alternatively, the vehicle speed index is set lower as the gear ratio of the transmission is higher, while the vehicle speed index is set higher as the gear ratio of the transmission is lower. Likewise, when the road type and speed limit Vr of the road on which the subject vehicle travels, the distance D from the subject vehicle to the object, or the traveling scene of the subject vehicle represents a traveling state that is estimated in a scene in which a number of pedestrians, bicycles, traffic signals, etc. exist around the subject vehicle and the subject vehicle travels at a relatively low speed, the vehicle speed index is set lower. Conversely, when the road type and speed limit Vr of the road on which the subject vehicle travels, the distance D from the subject vehicle to the object, or the traveling scene of the subject vehicle represents a traveling state that is estimated in a scene in which a number of other vehicles exist around the subject vehicle and the subject vehicle travels at a relatively high speed, the vehicle speed index is set higher. Through the above setting, when the vehicle speed index is low, the presentation image can be presented based on the captured image suitable for a scene in which a number of pedestrians, bicycles, traffic signals, etc. exist around the subject vehicle. Moreover, when the vehicle speed index is high, the presentation image can be presented based on the overview image suitable for a scene in which a number of other vehicles exist around the subject vehicle.

In one or more embodiments of the present invention, when the presentation image based on the captured image is presented, the mask process is performed for the right and left end parts of the captured image with an increased mask width d as the traveling speed V of the subject vehicle is higher. It is known that the field of view of the driver narrows as the traveling speed V of the subject vehicle increases. In one or more embodiments of the present invention, the mask process is performed with an increased mask width d as the traveling speed V of the subject vehicle is higher so that the relationship between the traveling speed V of the subject vehicle and the size of the captured image matches the relationship between the traveling speed V of the subject vehicle and the field of view of the driver, and the uncomfortable feeling given to the driver can thereby be mitigated. In addition, as the traveling speed V of the subject vehicle increases, the speed at which the landscape flows backward at the right and left end parts of the captured image (optical flow) increases to blur the image at the right and left end parts. In one or more embodiments of the present invention, as the traveling speed of the subject vehicle increases, the right and left end parts of the captured image can be masked thereby to mitigate the uncomfortable feeling given to the driver due to such blurring of the image.

In order to match the relationship between the traveling speed V of the subject vehicle and the field of view of the driver, if the presentation image to be presented to the driver is reduced as the traveling speed V of the subject vehicle increases, information on the object cannot be appropriately presented to the driver. Moreover, when the traveling speed V of the subject vehicle is high, this case is considered to represent a scene in which other vehicles traveling on the same road for the subject vehicle exist around the subject vehicle rather than a scene in which pedestrians and bicycles pass around the subject vehicle. In such a case, the positional relationships between the subject vehicle and other vehicles are important. In one or more embodiments of the present invention, therefore, when the vehicle speed index is "3" or higher, the presentation image based on the overview image is presented. This can mitigate the uncomfortable feeling given to the driver even when the relationship between the traveling speed V of the subject vehicle and the field of view of the driver is not matched, because the presentation image based on the overview image greatly differs from an image viewed from the point of view of the driver. Furthermore, the information on other vehicles traveling around the subject vehicle, which is important when the traveling speed V of the subject vehicle is high, can be appropriately presented to the driver.

In one or more embodiments of the present invention, when the presentation image based on the captured image is presented, as illustrated in FIGS. 7A-7B, the bonnet image imitating the bonnet of the subject vehicle is superimposed and displayed. This allows the driver to intuitively perceive that the captured image is an image captured ahead of the subject vehicle. In one or more embodiments of the present invention, the length of the bonnet image in the vertical direction (X-direction) is increased as the traveling speed V of the subject vehicle or the vehicle speed index is higher. This allows a visual effect to be obtained such that the bonnet of the subject vehicle is viewed with a higher angle as the traveling speed V of the subject vehicle is higher. As a result, the uncomfortable feeling given to the driver due to the change in angle can be mitigated even when the subject vehicle then accelerates and the presentation image based on the captured image changes to the presentation image based on the overview image thereby to change the angle of the presentation image so that the subject vehicle is viewed from more above, because the angle is changed in accordance with the traveling speed V of the subject vehicle before the presentation image based on the overview image is presented.

In one or more embodiments of the present invention, the camera 110, which captures images ahead of the subject vehicle, includes a short-distance camera (fisheye camera) suitable for capturing images of objects existing at short distances from the subject vehicle, a middle-distance camera suitable for capturing images of objects existing at middle distances from the subject vehicle, and a long-distance camera suitable for capturing images of objects existing at long distances from the subject vehicle. When the vehicle speed index is low, the presentation image is generated on the basis of the captured image captured by the short-distance camera, while when the vehicle speed index is high, the presentation image is generated on the basis of the captured image captured by the middle-distance camera. Thus, when the vehicle speed index is low, pedestrians, bicycles, etc. passing near the subject vehicle can be appropriately detected, and when the vehicle speed index is high, bicycles, motorcycles, etc. traveling ahead of the subject vehicle can be appropriately detected.

In one or more embodiments of the present invention, when the presentation image based on the captured image is presented, the detected objects detected by the camera 110 and/or the ranging sensor 120 are displayed in an emphasized manner. This allows the driver to appropriately perceive the detected objects which the information presentation apparatus 100 detects. In one or more embodiments of the present invention, the control object targeted for the automated driving control is displayed in an emphasized manner in a display form different from that of other detected objects. This allows the driver to appropriately perceive the control object targeted for the automated driving control. In one or more embodiments of the present invention, the distance information from the subject vehicle to the detected objects (including the control object) is superimposed on the detected objects and displayed. This allows the driver to appropriately perceive the distances from the subject vehicle to the detected objects.

In one or more embodiments of the present invention, when the presentation image based on the overview image is presented, the overview image is rendered with a different depression angle in accordance with the vehicle speed index. Specifically, as the vehicle speed index is higher, the overview image with a larger depression angle is rendered to obtain a visual effect such that the subject vehicle is viewed from more above. Through this operation, as illustrated in FIGS. 14A-14F, as the speed of the subject vehicle is higher, a wider area around the subject vehicle is displayed, and the driver can be presented with the traveling state of other vehicles traveling around the subject vehicle. As a result, even when the traveling speed of the subject vehicle is a medium speed or the subject vehicle is traveling at a high speed, another vehicle approaching the subject vehicle can be appropriately presented to the driver before the subject vehicle and the other vehicle come close to each other. For example, when the subject vehicle is traveling at a high speed, another vehicle tends to approach the subject vehicle at a higher speed as compared with a case in which the subject vehicle is traveling at a low speed. Even in such a case, a wider area around the subject vehicle can be displayed thereby to present another vehicle approaching the subject vehicle at a high speed to the driver at earlier timing (before another vehicle comes close to the subject vehicle).

In one or more embodiments of the present invention, when the presentation image based on the overview image is presented, the detected objects detected by the camera 110 and/or the ranging sensor 120 are arranged at positions on the overview image corresponding actual positional relationships between the subject vehicle and the detected objects. This allows the driver to appropriately perceive the positions at which the objects detected by the information presentation apparatus 100 are traveling around the subject vehicle. In one or more embodiments of the present invention, the control object targeted for the automated driving control is displayed in an emphasized manner. This allows the driver to perceive the control object targeted for the automated driving control. In one or more embodiments of the present invention, the distance guide lines suggesting the distances from the subject vehicle to the detected objects are superimposed on the overview image and displayed. This allows the driver to appropriately perceive the distances from the subject vehicle to the detected objects.

In one or more embodiments of the present invention, when the presentation image based on the captured image and the presentation image based on the overview image are switched, a switching image is presented which represents transition from the presentation image based on the captured image to the presentation image based on the overview image or transition from the presentation image based on the overview image to the presentation image based on the captured image. This can mitigate the uncomfortable feeling given to the driver due to switching from the presentation image based on the captured image, which is close to an image viewed from the point of view of the driver, to the presentation image based on the overview image, which is different from an image viewed from the point of view of the driver. Likewise, it is also possible to mitigate the uncomfortable feeling given to the driver due to switching from the presentation image based on the overview image, which is different from an image viewed from the point of view of the driver, to the presentation image based on the captured image, which is close to an image viewed from the point of view of the driver. In particular, in one or more embodiments of the present invention, switching between the presentation image based on the captured image and the presentation image based on the overview image can be continuously displayed as an animation thereby to more mitigate the uncomfortable feeling given to the driver. In one or more embodiments of the present invention, as the acceleration of the subject vehicle is higher, the switching time (a period of time during which the switching image is presented) is shortened (the speed of animation is increased) so that the switching operation between the presentation images is performed in association with the acceleration of the subject vehicle, and the driver can therefore feel unity with the subject vehicle.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, a configuration is exemplified in which the vehicle speed index is calculated on the basis of any of the traveling speed V of the subject vehicle, the gear ratio of the transmission, the road type of the road on which the subject vehicle travels, the limit speed Vr of the road on which the subject vehicle travels, the distance D from the subject vehicle to the object, and the traveling scene of the subject vehicle, and the presentation images are switched on the basis of the calculated vehicle speed index, but the present invention is not limited to this configuration, and another configuration may also be employed in which, for example, the presentation images are switched directly based on the traveling speed V, the gear ratio of the transmission, the road type, the speed limit Vr, the distance D to the object, or the traveling scene of the subject vehicle without calculating the vehicle speed index.

In the above-described embodiments, a configuration is exemplified in which, when the presentation image based on the captured image is displayed, the mask process is performed for the right and left end parts of the captured image on the basis of the traveling speed V of the subject vehicle or the vehicle speed index, but this configuration may be additionally modified such that the mask process is performed for the upper and lower end parts of the captured image on the basis of the traveling speed V of the subject vehicle or the vehicle speed index.

In the above-described embodiments, the camera 110 corresponds to the camera in the present invention, and the camera 110 and the ranging sensor 120 correspond to the detector in the present invention.

REFERENCE SIGNS LIST

100 Information presentation apparatus
110 Camera
120 Ranging sensor
130 Vehicle speed sensor
140 Navigation device
150 Display
160 Notification device
170 Control device

The invention claimed is:

1. A display control method comprising:
performing display control of detection information of an object detected by a detector including a camera, the detection information including a first image based on a captured image captured by the camera and a second image based on an image rendered on a basis of a detection result of the detector;
displaying the first image when a traveling speed of a vehicle is lower than a predetermined speed; and
displaying the second image when the traveling speed of the vehicle is not lower than the predetermined speed.

2. A display control method comprising:
performing display control of detection information of an object detected by a detector including a camera, the detection information including a first image based on a captured image captured by the camera and a second image based on an image rendered on a basis of a detection result of the detector;
displaying the first image when a vehicle speed index represents a vehicle speed lower than a predetermined speed, the vehicle speed index being any one of a traveling speed of a vehicle, a gear ratio of a transmission, a speed limit of a road on which the vehicle travels, a distance from the vehicle to the object, and a traveling scene of the vehicle, the traveling scene including a stop scene, a crawl scene, a bicycle parallel traveling scene, an urban traveling scene, a suburban traveling scene, and a high-speed cruising scene; and
displaying the second image when the vehicle speed index represents a traveling speed equal to or higher than the predetermined speed.

3. The display control method according to claim 2, wherein
the vehicle speed index is a gear ratio of a transmission,
the first image is displayed when the gear ratio is not lower than a predetermined value, and
the second image is displayed when the gear ratio is lower than the predetermined value.

4. The display control method according to claim 2, wherein
the vehicle speed index is a traveling speed of the vehicle,
the first image is displayed when the traveling speed is lower than a predetermined speed, and
the second image is displayed when the traveling speed is not lower than the predetermined speed.

5. The display control method according to claim 2, wherein
the vehicle speed index is a speed limit of a road on which the vehicle travels,
the first image is displayed when the speed limit is lower than a predetermined speed, and
the second image is displayed when the speed limit is not lower than the predetermined speed.

6. The display control method according to claim 2, wherein
the vehicle speed index is a distance from the vehicle to the object,
the first image is displayed when the distance is shorter than a predetermined distance, and
the second image is displayed when the distance is not shorter than the predetermined distance.

7. The display control method according to claim 2, wherein the vehicle speed index is a traveling scene of the vehicle, the traveling scene of the vehicle is determined on a basis of a traveling state of the vehicle, and the first image and the second image are switched and displayed on a basis of the traveling scene of the vehicle.

8. The display control method according to claim 2, wherein
when the first image is displayed, a mask process is performed for an end part of the first image with a width in accordance with a traveling speed of the vehicle or the vehicle speed index.

9. The display control method according to claim 2, wherein when the first image is displayed, a bonnet image imitating a bonnet of the vehicle is superimposed on the first image.

10. The display control method according to claim 9, wherein
a size or a shape of the bonnet image to be superimposed on the first image is changed in accordance with a traveling speed of the vehicle or the vehicle speed index.

11. The display control method according to claim 2, wherein
the camera comprises a plurality of cameras, the captured image comprises a plurality of captured images, the captured images captured by the cameras are acquired, and the captured image used for generation of the first image is selected from among the captured images captured by the cameras.

12. The display control method according to claim 2, wherein
the object detected by the detector is displayed in an emphasized manner in the first image.

13. The display control method according to claim 2, wherein
the object comprises a plurality of objects detected by the detector, and when control of travel of the vehicle is performed with one or more targeted objects among the detected objects, the one or more targeted objects for the control are displayed in the first image in an emphasized manner in a display form different from that of the objects which are not targeted.

14. The display control method according to claim 2, wherein
when the first image is displayed, distance information that suggests a distance from the vehicle to the object is superimposed on the first image.

15. The display control method according to claim 2, wherein
the second image is an image based on an overview image in which a subject vehicle is viewed from above.

16. The display control method according to claim 15, wherein
when the second image is displayed, the second image is displayed with a different depression angle in accordance with the vehicle speed index.

17. The display control method according to claim 2, wherein
when the second image is displayed, the object detected by the detector is arranged in the second image.

18. The display control method according to claim 2, wherein
the object comprises a plurality of objects detected by the detector, and when control of travel of the vehicle is performed with one or more targeted objects among the detected objects, the one or more targeted objects for the control are displayed in the second image in an emphasized manner.

19. The display control method according to claim 2, wherein
when the second image is displayed, distance information that suggests a distance from the vehicle to the object is superimposed on the second image.

20. The display control method according to claim 2, wherein
when the first image and the second image are switched, a switching image representing transition from the first image to the second image or transition from the second image to the first image is displayed.

21. The display control method according to claim 20, wherein
a switching time between the first image and the second image is changed on a basis of acceleration of the vehicle.

22. A display control device for performing display control of detection information of an object detected by a detector including a camera, wherein
the detection information includes a first image based on a captured image captured by the camera and a second image based on an image rendered on a basis of a detection result of the detector,
the first image is displayed when a traveling speed of a vehicle is lower than a predetermined speed, and
the second image is displayed when the traveling speed of the vehicle is not lower than the predetermined speed.

* * * * *